United States Patent
Martin et al.

(10) Patent No.: US 8,448,567 B2
(45) Date of Patent: May 28, 2013

(54) SOUP PREPARING AND DISPENSING MACHINE (SPDM) AND METHOD OF PRODUCING INDIVIDUAL SERVINGS OF HOT OR COLD SOUP USING THE SAME

(75) Inventors: Jose V Martin, Stevensville, MD (US); Angel Sanz, Reisterstown, MD (US)

(73) Assignee: Martin Batturs & Associates LLC, Stevensville, MD (US)

( * ) Notice: Subject to any disclaimer, the term of this patent is extended or adjusted under 35 U.S.C. 154(b) by 0 days.

(21) Appl. No.: 13/240,631

(22) Filed: Sep. 22, 2011

(65) Prior Publication Data

US 2012/0093996 A1   Apr. 19, 2012

Related U.S. Application Data

(60) Provisional application No. 61/393,223, filed on Oct. 14, 2010.

(51) Int. Cl.
*A21B 7/00* (2006.01)
*A23L 1/40* (2006.01)
*B65B 1/04* (2006.01)

(52) U.S. Cl.
USPC .......... 99/348; 99/323.3; 99/324; 99/330; 99/366; 99/373; 426/589; 426/394; 426/405; 426/407; 426/442; 141/104.9; 141/11; 141/82; 141/103; 141/250

(58) Field of Classification Search
USPC .......... 141/104, 9, 11, 82, 103, 250, 270, 141/283, 284, 352, 360, 373; 99/348, 323.3, 99/324, 330, 366–367, 373, 382, 409, 410, 99/517, 277.3, 287, 300, 316; 426/589, 394, 426/405, 407, 442, 444, 519, 524
See application file for complete search history.

(56) References Cited

U.S. PATENT DOCUMENTS

| | | | |
|---|---|---|---|
| 2,568,632 A | 9/1951 | Hutsell | |
| 3,041,185 A * | 6/1962 | Mck Martin | 426/232 |
| 3,146,691 A * | 9/1964 | Mck Martin | 99/330 |
| 3,593,888 A | 7/1971 | Brown | |

(Continued)

FOREIGN PATENT DOCUMENTS

JP   05137548 A  *  6/1993

OTHER PUBLICATIONS

International Search Report issued for related International Application No. PCT/US11/53150 dated Feb. 7, 2012.

(Continued)

*Primary Examiner* — Henry Yuen
*Assistant Examiner* — Ket D Dang
(74) *Attorney, Agent, or Firm* — H.C. Park & Associates, PLC

(57) ABSTRACT

Hot or Cold soup made fresh from scratch, can or concentrate is prepared in a suitable container and after its preparation is kept cool, blended and re-circulated for long term shelf life until a serving is requested. This serving volume of soup is automatically pumped and heated to serving temperature (hot soup) and served in a suitable container like a cup or a bowl. The entire system where the soup resides is always kept refrigerated. The only portion of the soup that is heated after its preparation is the one dispensed. If it is a soup that is served cold the heating prior to dispensing is by-passed.

11 Claims, 25 Drawing Sheets

U.S. PATENT DOCUMENTS

| | | |
|---|---|---|
| 4,189,071 A | 2/1980 | West |
| 4,361,176 A | 11/1982 | West |
| RE32,695 E * | 6/1988 | Nahra et al. ............... 261/118 |
| 4,993,593 A | 2/1991 | Fabiano et al. |
| 5,374,435 A | 12/1994 | Silvestrini et al. |
| 5,465,649 A | 11/1995 | Muis |
| 5,538,749 A | 7/1996 | Shimp |
| 5,540,263 A | 7/1996 | Hustvedt et al. |
| 6,012,608 A | 1/2000 | Ridenour |
| 6,454,127 B1 | 9/2002 | Suomela et al. |
| 7,997,304 B2 * | 8/2011 | Ranalletta et al. ............. 141/25 |
| 2002/0106435 A1 | 8/2002 | Fish et al. |
| 2007/0283820 A1 * | 12/2007 | Paredes Urzua ............ 99/331 |
| 2009/0145160 A1 | 6/2009 | Ubidia et al. |

OTHER PUBLICATIONS

"Turbo Range power Mixers" by Robot Coupe USA, Inc. 2003, Jackson, MS.

* cited by examiner

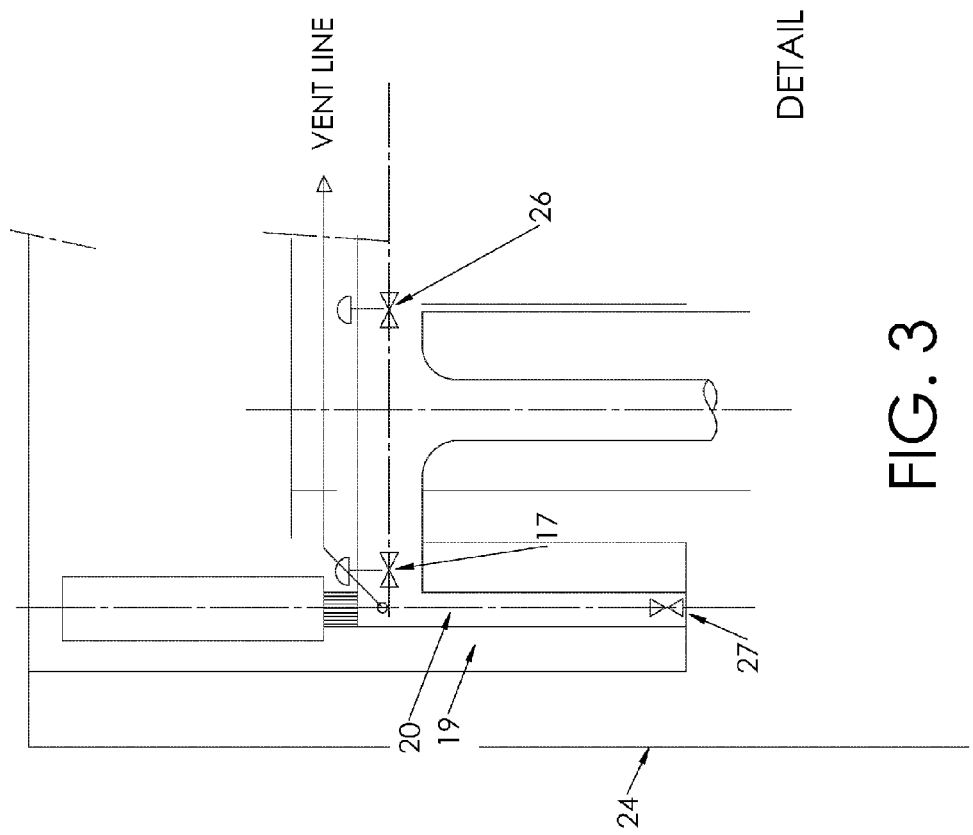

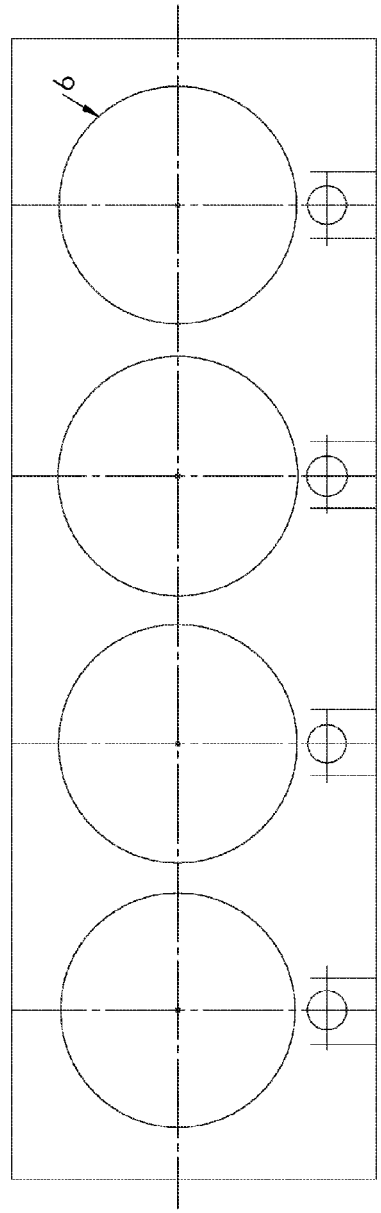
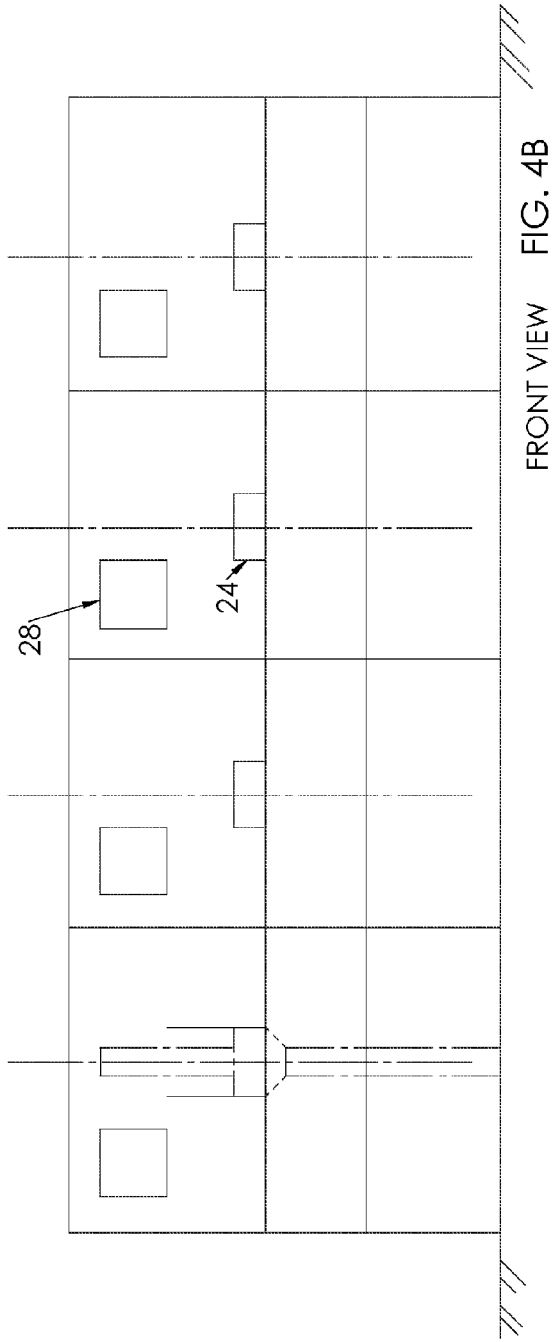
PLAN VIEW  FIG. 4A
FRONT VIEW  FIG. 4B

FIG 9 COOL STORAGE

FIG 10 DISPENSING

SPDM COLD & DARK READY FOR CHEF
SCRATCH OR CONCENTRATE COOKING

CHEF COOKING FROM SCRATCH OR CONCENTRATE

COOLING PROCESS FDA Food Code Section 3-501

(degrees F)

200 to 135 unlimited time (Very little bacteria growth)

135 to 70 equal or less than 2 hours 70 to 41.9 equal or less than 4 hours 41.9 to 34 degrees in 2 hours

CHILLING & REFRIGERATION

RE-CIRCULATION PROCESS

SOUP PREPARING AND DISPENSING MACHINE (SPDM) AND METHOD OF PRODUCING INDIVIDUAL SERVINGS OF HOT OR COLD SOUP USING THE SAME

CROSS REFERENCE TO RELATED APPLICATION

This application claims the benefit of U.S. Provisional Patent Application No. 61/393,223, filed on Oct. 14, 2010, which is hereby incorporated by reference for all purposes as if fully set forth herein.

BACKGROUND OF THE INVENTION

1. Field of the Invention

Exemplary embodiments of the present invention relate to an apparatus and method for preparing, cooling for long term storage and automatically dispensing food and beverage products, and more particularly to an apparatus and method for hot or cold batch preparing, cooling for long term storage and automatically dispensing individual servings of hot or cold soup made fresh from scratch, can or concentrate.

2. Discussion of the Background

Soup is a savory liquid food that is made by boiling ingredients, such as meat, vegetables and beans in stock or hot water, until the flavor is extracted, forming a broth. Boiling was not a common cooking technique until the invention of waterproof containers about 5,000 years ago.

Traditionally, soup is classified into two broad groups: clear soups and thick soups. The established French classifications of clear soups are bouillon and consommé. Thick soups are classified depending upon the type of thickening agent used: purées, which are vegetable soups thickened with starch; bisques are made from puréed shellfish thickened with cream; cream soups are thickened with béchannel sauce; and veloutés are thickened with eggs, butter and cream. Other ingredients to thicken soups and broths include rice, flour, and grains.

Soup may have various sized whole, diced or sliced vegetables, herbs, spices, meats, grains and the like in the various broths.

Soup concentrate/powder as we know or understand today originated in the form of condensed soup, which is a canned variety of soup prepared with a reduced proportion of water. The consumer was required to add water or milk to the condensed soup and heat the mixture. Condensed soup was developed by John T. Dorrance, an employee of the Campbell's® Soup Company, in 1899.

There may be many important health and nutritional reasons to consume delicious soup. Soup may provide vitamins, antioxidants and some varieties of soup can add fiber to the diet. Plus many soups are packed with vegetables helping a consumer reach a daily goal of five servings of fruits and vegetables.

Soups come in so many varieties that the actual nutrient composition differs depending on the ingredients used, but here are some examples of the goodness that soups can provide. Tomato soup is a good source of vitamins A, Bs, C and the powerful antioxidant called lycopene. Pumpkin soup is also packed with potassium and Vitamin A. Sweetcorn & Potato soup is a great fiber boost. Minestrone soups can contain as many as eight to ten different vegetables. Soups may also be a great way to increase fluid intakes over the colder winter months when it is less appealing to drink cold water.

Soup is not only a good way to boost ones intake of nutrients but it fits within a healthy balanced diet too. A bowl or mug of soup with a couple of slices of wholegrain toast may be a meal generally low in fat. More and more it is becoming important to lower energy and fat intake to help lessen the risk of becoming overweight or obese.

Restaurants, cafeterias and other food establishments around the world, often offer their customers hot or cold soups. In most food establishments the soup is either made fresh from scratch or from a soup can or concentrate blend with water and/or milk. The disadvantage that these establishments have now is that to be able to serve soup quickly, the soup pot is kept hot and the portion of the soup that is not sold during the day has to be discharged, creating waste and pollution. Kitchens that keep the soup refrigerated use significant space and labor time to cool and heat the dispensing portions.

The quality of the soup may degrade rapidly over time with continuous heating. The aforementioned disadvantages are further complicated when more than one type of soup is served. A need exists for a method of automatically dispensing hot or cold soup made fresh from scratch, can or concentrate that is continuously kept cool until being served, for long shelf life and consumed completely without waste or pollution.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide an apparatus to hot or cold prepare soup made fresh from scratch, can or concentrate, to chill, cold store and blend the prepared soup and to dispense the soup heated or chilled into suitable containers.

Exemplary embodiments of the present invention also provide a process for hot or cold preparation of soup made fresh from scratch, can or concentrate, processing, blending, cooling, cold storing and dispensing the soup hot or cold into suitable containers.

Additional features of the invention will be set forth in the description which follows, and in part will be apparent from the description, or may be learned by practice of the invention.

An exemplary embodiment of the present invention discloses a soup preparing and dispensing machine (SPDM) module to batch prepare soup, cold store the soup and dispense the soup in a serving size. The module includes a soup container to prepare and hold a batch of soup. The container has a top opening defined by upper edges of vertical sidewalls, and a bottom extending from the vertical sidewalls to a bottom opening. A heating and cooling pack snugly surrounds the soup container sidewalls and bottom, to heat the soup container to hot prepare the batch of soup in the container, to cool the hot prepared batch of soup in the soup container and to refrigerate the prepared batch of soup in the soup container. A soup container agitator and wiper is located in the soup container to stir the contents of the soup container during the preparation, cooling and refrigeration. The module also includes a soup container engine to pump a first portion of the prepared soup from the bottom opening of the soup container to a soup container engine discharge pipe that receives the first portion and the soup container engine discharge pipe is located within a portion of the heating and cooling pack. A heating chamber engine including an inlet to receive a second portion from the soup container engine discharge pipe and an outlet to dispense the second portion is also included in the module, wherein the second portion is pushed through the inlet by the first portion pumped into the soup container engine discharge pipe, and the first portion and the second portion are substantially the same volume. The heating chamber engine heats the second portion in the heating chamber engine to a serving temperature and dispenses the heated second portion.

An exemplary embodiment of the present invention also discloses a soup preparing and dispensing machine (SPDM) apparatus to batch prepare soup, cold store the soup and dispense the soup in a serving size, the apparatus including a cabinet capable of housing at least one soup preparing and dispensing machine (SPDM) module, at least one soup preparing and dispensing machine (SPDM) module located in the cabinet, a refrigeration pack located in the cabinet to provide cooling to at least one heating and cooling pack, a water supply tube to provide water to the at least one SPDM module, a power supply to provide power to the at least one SPDM module, and a controller to control at least one of the heating and cooling pack, the soup container agitator and wiper, the soup container engine, the heating chamber and nozzle, the refrigeration pack, the water supply tube, the power supply, and a combination thereof.

An exemplary embodiment of the present invention also discloses a method of batch preparing, refrigerating and dispensing single servings of hot soup using a soup preparing and dispensing machine (SPDM) module, the module comprising a soup container, a heating and cooling pack, a soup container agitator and wiper disposed in the soup container, a soup container engine to pump, a soup container engine discharge pipe, and a heating chamber to heat a single serving, the method including heating soup ingredients in the soup container using the heating and cooling pack while stifling the ingredients using the agitator and wiper to form a batch prepared soup. The method includes cooling the batch prepared soup in the soup container using the heating and cooling pack while stifling the ingredients using the agitator and wiper to form a chilled batch prepared soup. The method includes refrigerating the chilled batch prepared soup using the heating and cooling pack while stifling the ingredients using the agitator and wiper to form a cold stored prepared soup. The method includes heating a single serving of the cold stored prepared soup using the soup container engine to pump a first portion of the cold stored prepared soup into the soup container engine discharge pipe pushing a second portion of the cold stored prepared soup into the heating chamber engine, and heating the second portion of cold stored prepared soup in the heating chamber engine, wherein the second portion is substantially the same volume as the first portion. The method also includes dispensing the heated second portion as a single serving of hot soup.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 is a cross-sectional view showing a detail of area B in FIG. 1 according to the first exemplary embodiment of the present invention.

FIG. 4A shows a plan view of four soup prep and dispensing modules in a cabinet of a SPDM apparatus according to a second exemplary embodiment and FIG. 4B shows a front view of the four soup prep and dispensing modules in the cabinet of FIG. 4A.

DETAILED DESCRIPTION OF THE ILLUSTRATED EMBODIMENTS

Figure 1:
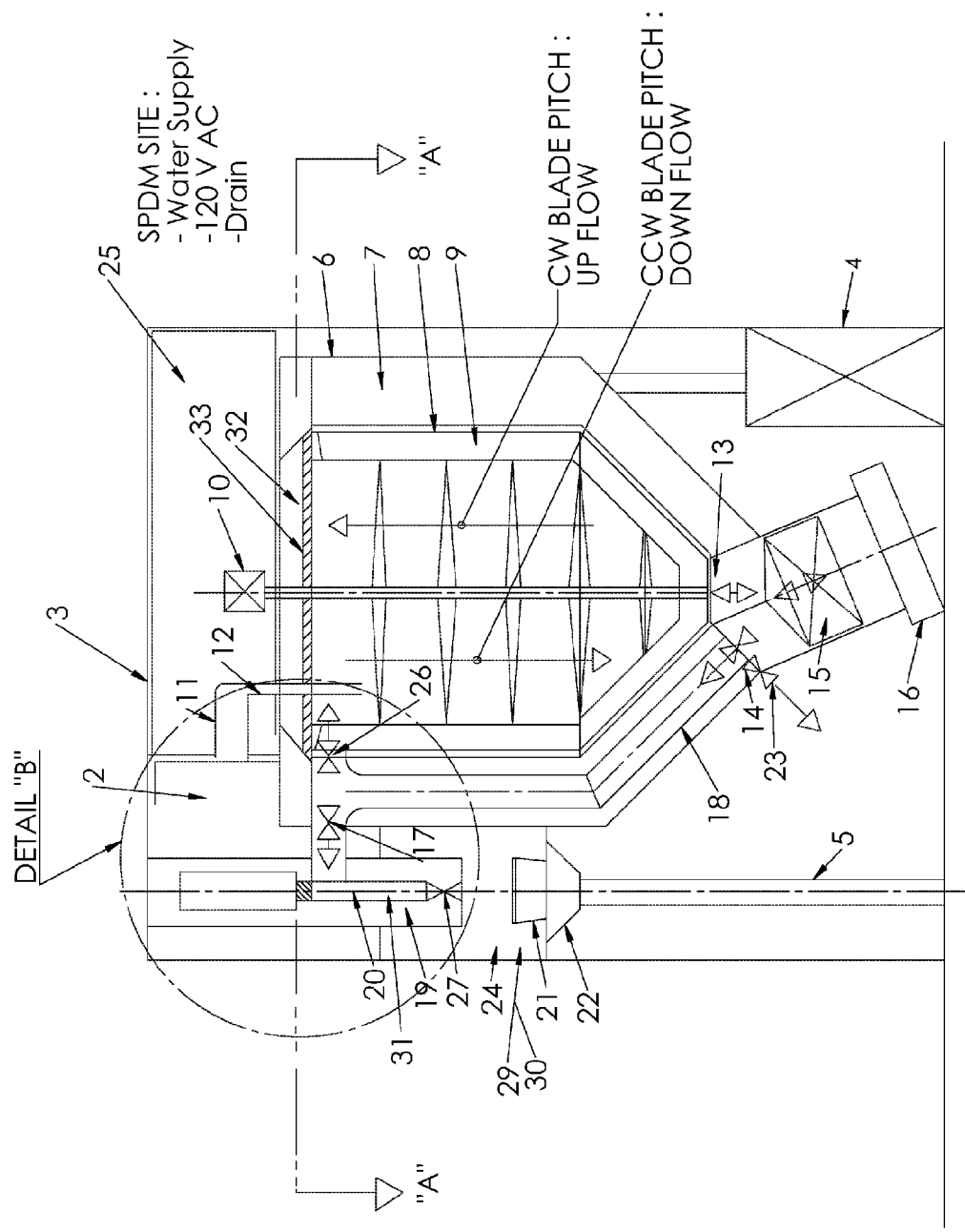
FIG. 1 is a cross-sectional view showing a soup preparing and dispensing machine (SPDM) apparatus according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
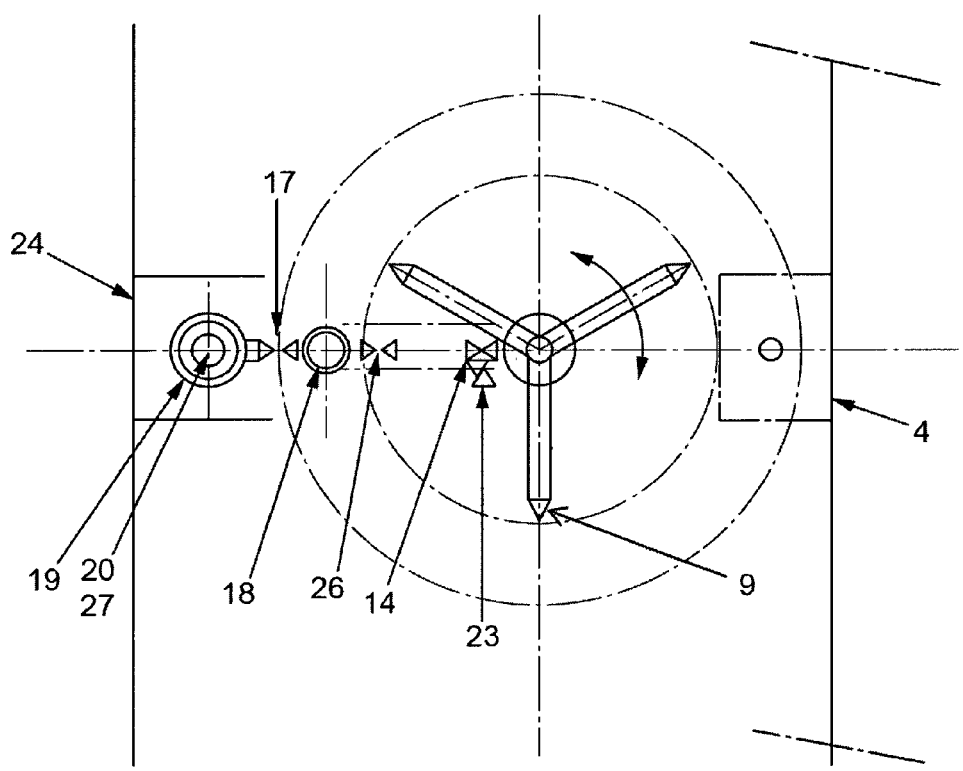
FIG. 2 is a plan view showing the SPDM apparatus according to the first exemplary embodiment of the present invention at cross-section A-A in FIG. 1.

FIG. 1 is a cross-sectional view showing the SPDM apparatus 1 according to the first exemplary embodiment of the present invention. FIG. 2 is a plan view cross section at line A-A in FIG. 1 showing the SPDM apparatus 1 according to the first exemplary embodiment of the present invention. FIG. 3 is a cross-sectional view showing detail B in FIG. 1.

In a first exemplary embodiment as shown in FIG. 1, a soup preparing and dispensing machine (SPDM) apparatus 1 includes a soup preparing and dispensing module 6. According to a second exemplary embodiment, a SPDM apparatus 1 may have a plurality of soup preparing and dispensing modules 6. The SPDM apparatus 1 according to the second exemplary embodiment (see FIGS. 4A and 4B) may have a soup preparing and dispensing module 6 for each type of soup and as many soup preparing and dispensing modules 6 as kinds of soup to be served. In addition, the soup preparing and dispensing machine (SPDM) apparatus 1 may have the same type of soup in more than one soup preparing and dispensing module 6.

To carry out a process of making soup according to exemplary embodiments using an apparatus of the first exemplary embodiment or the second exemplary embodiment, all the ingredients for making a hot soup or a cold soup made fresh from scratch are loaded into a soup container 8. The soup container 8 may be a food grade stainless steel vessel clad with copper or aluminum to facilitate heat transfer and withstand heating and cooling during soup preparation and cold storing. The soup container 8 may optionally be copper, a copper alloy, aluminum, an alloy of aluminum, unclad stainless steel, cast iron, porcelain on steel, porcelain on cast iron (wine handling) or the like. The soup container 8 may be a pressure vessel such as a pressure cooker. A heating and cooling pack 7 (thermal pack) surrounding a periphery of the soup container 8 is set to a heat mode in an exemplary embodiment to hot process the soup and the ingredients are heated and blended by a soup container agitator and wiper 9 until boiling and/or according to the particular soup recipe. A soup container agitator and wiper motor 10 drives the soup container agitator and wiper 9. The soup container agitator and wiper motor 10 may also drive cutting blades to facilitate the recipe preparation or the soup container agitator and wiper 9 may include cutting blades. In another exemplary embodiment of the soup preparing process, the heating and cooling pack 7 is set in a cold mode to cold process the soup and the ingredients are chilled, re-circulated and mixed by the soup container agitator and wiper 9 until blended and/or according to the particular soup recipe. Such a cold process may be used to prepare gazpacho soup or the like.

In the exemplary embodiments of preparing hot or cold soups made from can or concentrate, the ingredients may be loaded into the soup container 8. The soup container 8 is then heated by the heating and cooling pack 7 to a temperature, for example, in a range from 190° F. to 205° F. The heating temperature may be lower or higher than this range depending on the requirements of the recipe. For example, the heating and cooling pack 7 may heat the soup to a temperature in a range from 110° F. to 190° F. or to a temperature in a range from 205° F. to 220° F. For example, miso soups may be heated below boiling as may be the case for soups containing cream, butter and/or eggs. The soup container agitator and wiper 9 may rotate within the soup container 8 and wipe along the interior walls of the soup container 8 to circulate the ingredients. The soup container agitator and wiper 9 may be switched on and off during heating or may be continuously on. The soup container engine 16 and recirculation valve 26 as described later may also be switched on and off during heating or may be continuously on to circulate contents of the soup container 8 from the bottom of the soup container 8 to the top of the soup container 8.

The soup container agitator and wiper 9 may rotate in a first direction, such as clockwise, and in a second direction, such as counter clockwise to improve the agitation process. The rotation speed or rotations per minute (RPM) can be programmed by an electrical instrumentation and control 2 (FIG. 5) to handle the different types of recipes. A process of circulating the soup from the bottom of the soup container 8, through a soup container engine discharge pipe 18 and back to the top of the soup container 8 may also contribute to the homogeneous blending of the soup. During a process of dispensing an order of soup the agitator 9 may use a combination of rotation and blade pitch to induce a "down flow" to improve the flow out of the bottom of the soup container 8.

Another exemplary embodiment of the soup preparing process includes filling the soup container 8 with soup made fresh from scratch, can or concentrate in a kitchen prior to filling the soup container 8. Such a process may involve a traditional soup preparation and transfer of the traditionally prepared soup into the soup container 8.

The soup container agitator and wiper 9 keeps the soup well blended at programmed times depending on the kind of soup recipe. The soup in the soup container 8 is properly prepared according to the exemplary embodiments and then the soup is chilled in the soup container 8 by the heating and cooling pack 7. The heating and cooling pack 7 set to a cool mode keeps the soup at a cold temperature, for example, between 29° F. and 45° F., between 32° F. and 42° F., between 34° F. and 40° F., between 34° F. and 42° F., between 34° F. and 45° F. between 32° F. and 34° F., or the like, for long term storage. Long term storage may be, for example, in a range from a few hours to a few days, in a range from one day to six days, or the like. The soup container agitator and wiper 9 may keep the soup well blended during cold storage (refrigeration) for the long term storage. Factors that may affect the cold storage term (time period) may include dispensing consumption rate of the soup, the fragility of the soup ingredients, desires of the SPDM apparatus 1 user, cold storage temperature, and the like. A gas, such as nitrogen, may be contained in the soup container 8 over the surface of the soup to prolong the fresh storage of the soup or other contents of the soup container 8.

A process of dispensing soup from the soup container 8 in the SPDM apparatus 1 according to exemplary embodiments includes a soup container engine 16 or another type of pump to pump the soup from the soup container 8. Optionally, the soup may be dispensed by a gravity feed process. In an exemplary embodiment of using the soup container engine 16, a piston 15 of the soup container engine 16 is in a normal position against the bottom of the soup container 8. The bottom of the soup container 8 may have a soup container engine intake valve 13. When the soup is to be served the soup container engine intake valve 13 opens and the soup container engine piston 15 is drawn back to fill the piston chamber with soup. The piston 15 may be drawn back to fill the piston chamber with a volume of soup that corresponds to the volume of a serving container 21. The soup container engine intake valve 13 closes and a soup container engine discharge valve 14 opens and the soup container engine piston 15 pushes the soup out of the soup container engine 16 chamber through the open soup container engine discharge valve 14 and into a soup container engine discharge pipe 18. The serving container 21 size can be a medium cup that would hold about 8 ounces of soup, for example, 6 to 10 ounces, a small bowl that would hold about 12 ounces of soup, for example, 10 to 14 ounces, or a large bowl that would hold about 16 ounces of soup, for example, 14 to 20 ounces.

In an optional exemplary embodiment, the soup container agitator and wiper 9 may include a hollow vertical axis having a vertical pipe inside the vertical axis. The vertical pipe may have a lower opening proximate to the bottom of the soup container 8 and an upper opening connected to a soup container engine intake valve located above the soup container. In such an embodiment, the soup container engine 16 may pump the soup from the lower opening in the vertical pipe to the heating chamber engine.

The soup container engine discharge pipe 18 transports the soup to a soup container engine dispensing valve 17. When the soup container engine recirculation valve 26 is closed and the soup container engine dispensing valve 17 opens, the soup is delivered to a heating chamber engine 20. The heating chamber engine 20 includes a chamber to heat the soup and a heating chamber engine valve 27 to dispense the heated soup out of the heating chamber engine 20 after the soup is heated.

When the soup container engine recirculation valve 26 is open and the soup container engine dispensing valve 17 is closed, the soup is delivered to the top of the soup container 8. Accordingly, the soup container engine 16 and recirculation valve 26 circulate contents of the soup container 8 from the bottom of the soup container 8 to the top of the soup container 8. During such recirculation the soup container engine piston 15 may be drawn back to fill the piston chamber with a volume of soup that may correspond to a recirculation volume of soup. The recirculation volume may correspond to a serving volume. The soup container agitator and wiper 9 and the soup container engine 16 working with the soup container engine re-circulation valve 26, keep the soup well blended at programmed times depending on the kind of soup recipe.

Figure 11:
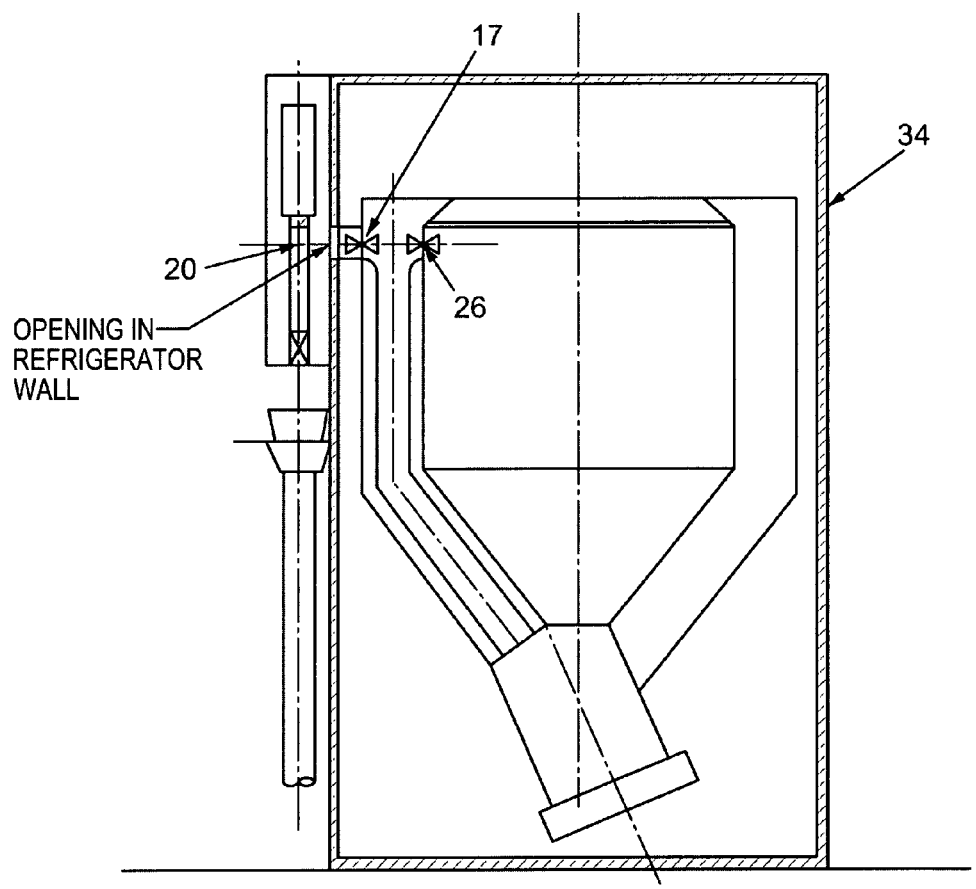
FIG. 11 is a cross-sectional view showing a soup preparing and dispensing machine (SPDM) apparatus according to another exemplary embodiment of the present invention.

FIG. 11 is a cross-sectional view showing a soup preparing and dispensing machine (SPDM) apparatus according to an alternative arrangement of the first exemplary embodiment of the present invention. In this alternative arrangement, the heating and cooling pack 7 may operate as a heating pack only and the soup prep and dispensing module 6 may be located within a cooling and isolating refrigeration cabinet 34. Heating may be provided by induction heating, microwave heating, conduction heating, radiation heating, convection heating, steam heating and the like. The soup container 8 may be copper/stainless steel, aluminum/stainless steel, copper, alloys thereof, aluminum, alloys thereof, cast iron, porcelain clad steel, porcelain clad cast iron, ceramic, glass, and the like. For example, when the soup container 8 is glass, a window in the refrigeration cabinet 34 may provide a user with a side view into the soup container 8 without opening the refrigeration cabinet 34.

The heating chamber engine 20 is located outside of the refrigeration cabinet 34. In this alternative arrangement, the heating and cooling pack 7 operates to heat the soup container 8 for batch preparing soup as described, however the refrigeration cabinet 34 operates to cool the soup container 8 in this alternative embodiment as described elsewhere herein by the heating and cooling pack 7 in cooling mode. The soup container dispensing valve 17 may be positioned in an opening in the refrigeration cabinet 34. When the soup container dispensing valve 17 is in the closed position, the soup contained within the refrigeration cabinet 34, such as, within the soup container engine discharge pipe 18, the soup container 8, the soup container engine 16 and the other components within the refrigeration cabinet 34, may be kept cold. When the soup container dispensing valve 17 is in the open position, the soup may flow into the heating chamber engine 20 exterior to the refrigeration cabinet 34.

The component of the soup preparing and dispensing module 6 designed to heat the individual serving of soup includes the soup container engine dispensing valve 17 that when open allows the flow of soup from the soup container engine discharge pipe 18 to the heating chamber engine 20 where the soup is contained by the heating chamber engine valve 27 until the serving temperature is reached. At that time the heating chamber engine valve 27 opens and the piston of the heating chamber engine 20 pushes the soup to the serving container 21. To enhance the heat transfer process, the entrance into the heating chamber engine 20 may have a geometry that generates a turbulent flow.

The soup container engine recirculation valve 26 opens allowing the soup to be re-circulated back to the soup container 8 when the soup container engine dispensing valve 17 closes. The blending of the soup while in refrigerated storage is accomplished by the cycling of the soup container agitator and wiper 9 and the soup container engine 16 coupled to the soup container engine recirculation valve 26.

Generally, the heating chamber engine 20 maintains a low temperature constantly. When soup is delivered to the heating chamber engine 20, the heating chamber engine 20 may rapidly heat the soup to a hot serving temperature in an exemplary embodiment. On the other hand, the heating chamber engine 20 may maintain the low temperature to maintain a cold soup serving temperature in another exemplary embodiment.

When the soup container engine dispensing valve 17 is open, the soup flows to the heating chamber engine 20 that has the heating chamber engine valve 27 closed and a heating chamber engine piston retracted. The soup may be rapidly heated in the heating chamber engine 20 with an induced turbulent flow. When the soup reaches serving temperature the heating chamber engine valve 27 opens and the piston in the heating chamber engine 20 pushes the remaining of the soup into the serving container 21.

According to an exemplary embodiment of the process of providing a serving of soup, the SPDM apparatus 1 may operate in an automatic mode. For example, in an automatic mode the instrumentation and control 2 may be coupled to a restaurant's ordering system where the waiters enter orders (requests for certain food servings) to the kitchen through a terminal or a remote controller. The restaurant's ordering system may then maintain an inventory and accounting of the soup orders while the SPDM apparatus automatically dispenses the requested servings.

Automatic operation of the SPDM apparatus 1 may include a user input order. The user of the SPDM apparatus 1 orders a serving of soup by depositing money in the electrical instrumentation and control 2 in a coin operated embodiment of the SPDM apparatus 1, swiping a credit card in a credit card operated machine embodiment or by pushing a button in a staff operated embodiment. A message may appear on a display, such as an operator interface display 28 of the electrical instrumentation and control 2 asking the operator to insert a serving container 21 such as a cup, mug, bowl, carry-out container or the like under an outlet of the heating chamber engine 20. Such an outlet of the heating chamber engine 20 may be the heating chamber engine valve 27.

A serving container tray 22 may support the serving container 21 while the soup is dispensed into the serving container 21. The serving container tray 22 may be automated to sequentially position serving containers 21 under the outlet of the heating chamber engine 20 to be filled in coordination with the soup dispensing. The serving containers may be stored in a warmed pre-serving compartment of the SPDM apparatus 1 before being filled. The filled serving containers 21 may then be automatically positioned in a temporary warmed waiting area to be picked up by the user such as the waiter. Such automation may include drop-down, turn-table or conveyor belt type container positioners. A serving container sensor may detect whether a serving container 21 is in position to receive the dispensed hot or cold soup. Also the serving container tray 22 may be positioned over a drain 5 and allow liquids to pass through the serving container tray 22 to the drain 5 without spilling beyond the perimeter of the serving container tray 22.

When there is an order for dispensing soup, the soup container engine piston 15 pulls back from the normal position to fill the piston chamber with a volume of soup corresponding to the volume of soup to be dispensed. The soup flows through the open soup container engine intake valve 13, fills the cylinder cavity and then the soup container engine piston travels forward, the soup container engine discharge valve 14 opens and the soup flows through the soup container engine discharge pipe 18 to the soup container engine dispensing valve 17. Each of the valves may be solenoid valves operated automatically by signals from the electrical instrumentation and control 2 as described in the current exemplary embodiment or the valves may be pressure actuated (check valves).

The heating chamber engine 20 goes to a high heat mode when there is an order for dispensing hot soup, ready to heat the soup that flows through it to the serving container 21. The temperature of the soup is increased from the cold storage temperature, for example, between 34° F. to 40° F. to the "ready to serve" temperature in a range from 190° F. to 205° F. as the soup flows into the cylinder of the heating chamber engine 20. Heating can occur by induction heating, microwave heating, conduction heating, radiation heating, convection heating, steam heating and the like. Once the soup is heated to serving temperature, the heating chamber valve 27 opens to dispense the soup. From a nozzle at the outlet of the heating chamber valve 27, the serving container 21 is filled. When the heating chamber valve 27 is open to dispense the heated soup into the serving container 21, the piston of the heating chamber engine 20 clears the cylinder of the heating chamber engine 20.

As the heated soup is dispensed from the heating chamber valve 27 a high speed agitator mounted in the heating chamber 19 may provide a foamy or whipped dispensed serving. Optionally, steam, steamed milk or the like may be introduced to the soup as the heated soup is dispensed from the heating chamber valve 27. The heating chamber engine 20 may include the high speed agitator or a nozzle to introduce additional heated or cooled ingredients to the dispensed serving of heated soup, cold soup, beverage or the like.

The soup container engine dispensing valve 17 shuts off the flow of soup after the dispensing operation and also serves to keep the soup safe, isolated and cool until the next serving. The soup may be kept safe, isolated and cool within the heating and cooling pack 7 as shown in the exemplary embodiment of FIG. 1 or within the refrigerator cabinet 34 as shown in the exemplary embodiment in FIG. 11. If the soup is supposed to be served cold, the heating chamber engine 20 is not heated. Any spilling flows into the drain 5 through the serving container tray 22. A vent line that drains into the soup container 8 serves to prevent air entrapment during the flow of soup into the heating chamber engine 20.

In an optional embodiment where the soup is delivered to the heating chamber engine 20 by gravity feed, the soup container engine intake valve 13 may be replaced with a soup container outlet valve (not shown). In such an exemplary embodiment, the soup container outlet valve may deliver the soup to the heating chamber engine 20.

The heating chamber engine 20 and the soup container engine dispensing valve 17 may be designed to generate a swirl action that creates a turbulent flow that increases the efficiency of the heating and blending operation. For example, the heating chamber engine 20 and/or the soup container engine dispensing valve 17 may have riflings, ridges, grooves and the like on an inner surface to create the turbulent flow.

The heating chamber engine 20 may have a rinse water input to provide rinse water to the heating chamber engine 20 between servings of soup. In such an exemplary embodiment, the rinse water would dispense into the drain 5. The heating chamber engine 20 may be heated to a sterilizing temperature to kill bacteria that may be present.

Accordingly, advantages are provided by the exemplary embodiments of the SPDM apparatus 1 in labor savings and customer service since soup servings can be treated like traditional soda, milk, tea, juice, wine, coffee, water, etc. servings with the soup machine being located in a galley area, accessible to a waiter/waitress and not interfering with kitchen personnel. Servings to customers can be efficient and effective. The soup is kept cold, well is blended and fresh until a serving is desired. When a serving is desired, a hot single serving can be quickly provided heated to the serving temperature or may be served cold. The SPDM apparatus 1 equipped with the automatic dispensing arrangement to handle multiple serving containers 21 may automatically fill multiple soup servings. When a waiter orders multiple soup servings, the machine may automatically fill the number of requested serving containers 21 in response to the order.

When the soup container 8 is empty, it is filled with a U.S. Food and Drug Administration (USFDA) approved food preparation equipment water cleaning solution by adding the cleaner to water coming from a water supply tube 11 in an exemplary embodiment of a cleaning process. Then the heating and cooling pack 7 goes to high heat mode to boil the water solution, the soup container agitator and wiper motor 10 is activated and the cleaning solution is then pumped through the soup container engine to the soup container engine recirculation valve 26 and to the drain 5 until clear water flows through it. A cleaning cycle sensor may detect clear water flowing out of the heating chamber 20 and send a signal to the controller 2 indicating an end of the cleaning cycle in response to the detection. Optionally, a soup container engine drain valve 23 may be manually or automatically opened to drain the soup container engine discharge pipe 18. After cleaning the soup container 8 is ready for another batch of soup.

According to another exemplary embodiment of a process to clean the soup dispensing module 6, the soup container 8, soup container engine 16, soup container engine discharge pipe 18, and heating chamber engine 20 may be removed and cleaned.

In an exemplary embodiment of operating the soup preparation and dispensing machine apparatus 1, the apparatus 1 is primed before dispensing soup. In such a priming operation when the soup preparation and dispensing module 6 is empty, it may need to be primed is to begin the automatic operation. Referring to FIG. 1, FIG. 2 and FIG. 3, when the soup container 8 is filled with a new batch of soup, the soup container engine 16 is activated with enough cylinder strokes to fill the soup container engine discharge pipe 18. Soup may flow until a soup flow sensor detects soup flow through the soup container engine recirculation valve 26. After the priming operation the SPDM apparatus 1 is ready to serve soup.

According to the first exemplary embodiment as shown in FIG. 1, FIG. 2 and FIG. 3, the soup preparing and dispensing machine (SPDM) apparatus 1 may include a soup dispensing cabinet 3, an electrical instrumentation and control (controller) 2, a refrigeration pack 4, a container tray 22, a drain 5, a serving container 21, a water supply tube 11, a temperature sensor and control 12, a heating chamber shield 24, a heating chamber shield sensor 29, a serving container sensor 30, a soup prep and dispensing module access door 25, an operator interface display 28 and a soup prep and dispensing module 6.

Referring to FIG. 1, FIG. 2 and FIG. 3 the soup prep and dispensing module 6 may include: a heating and cooling pack 7, a soup container 8, a soup container agitator and wiper 9, soup container agitator and wiper motor 10, a soup container engine 16, a soup container engine piston 15, a soup container engine intake valve 13, a soup container engine discharge valve 14, a soup container engine drain valve 23, a soup container engine discharge pipe 18, a soup container engine dispensing valve 17, a heating chamber 19, a heating chamber engine 20, a soup container engine recirculation valve 26, a heating chamber engine valve 27, a serving temperature sensor 31 and a soup container lid and vent 32.

The soup container 8 may be designed to have a close fit with the inside wall of the heating and cooling pack 7 to promote efficient thermal transfer of heat to heat or cool. The material of the soup container 8 walls is of a copper/stainless steel, aluminum/stainless steel, copper, aluminum, alloys thereof, cast iron, porcelain clad steel, porcelain clad cast iron (wine handling) and the like to have a high heat transfer coefficient and to avoid transferring unwanted flavors from the material to the food or beverage. The soup container 8 may be easily removable from the heating and cooling pack 7. The bottom of the soup container 8 may include an opening to tightly fit and seal with the soup container engine intake valve 13. The soup container 8 volume is designed for a soup dispensing capacity of about 5 to 6 days. For example, the soup container volume may be in a range from one gallon to 15 gallons, or in a range from one to eight quarts. For example, the soup container capacity may be five gallons. The top of the soup container may have a screen to prevent the entry of objects greater that the machine can handle.

A soup container 8 full or partially full of soup may be removed from the SPDM module 6 by closing the soup container engine intake valve 13, opening a soup prep and dispensing module access door 25 and tilting the soup container agitator and wiper motor 10 to one side. The full or partially full soup container 8 is removable through the soup prep and dispensing module access door 25 opening while the soup container engine intake valve 13 in the closed position seals the soup container 8 bottom opening.

The soup container agitator and wiper 9 is designed to be supported by the soup container agitator and wiper motor 10 on top of the soup container 8 and may be supported by a three radial support on the bottom of the soup container 8. The soup container agitator and wiper motor 10 may be a variable speed motor capable of rotating in two directions (for example, forward and reverse, or clockwise and counter clockwise). The soup container agitator and wiper motor 10 may be programmable to run at different speeds, different directions and for is different times to accommodate the soup recipes. The soup container agitator and wiper 9 may have blades with a built-in pitch to promote flow direction.

The temperature of the soup container 8 may be controlled by the temperature sensor and control 12. The water supply tube 11 supplies water to take care of the needs of cooking the soup and cleaning and rinsing operations.

The heating and cooling pack 7 is designed to supply the heating and cooling needs of the soup container 8 and the soup container engine discharge pipe 18. In the alternative first exemplary embodiment, the refrigeration cabinet 32 may supply the cooling needs of the soup container 8 and the soup container engine discharge pipe 18. The heating and cooling pack 7 provides heat for cooking and cleaning and cooling for long time storage of the soup. The heating may be accomplished with heating elements integrated in the heating and cooling pack 7 structure. The cooling may be supplied by a refrigeration pack 4 mounted in the cabinet 3. The cabinet 3 may provide an insulated cover to the soup container 8. The soup container 8 may have a lid and vent 32.

The soup container engine 16 has a soup container engine piston 15. The piston stroke may be controlled by a linear motor programmed for the dispensing volumes, circulation operations and cleaning operations, and capable to be programmed for a manual mode. The top of the cylinder may be connected to the soup container engine intake valve 13 and the soup container engine discharge valve 14. These valves are solenoid operated by electric signals from the electrical instrumentation and control 2. They may also be special check valves designed to open in a specific direction to allow the flow of fluid from the soup container 8 to the soup container engine discharge pipe 18.

The soup container engine discharge pipe 18 handles the fluid from the soup container engine 16 to the soup container engine dispensing valve 17 which is a solenoid operated by electrical signals from the electrical instrumentation and control 2. It may also be a check valve designed to open in a specific direction to allow the flow to the heating chamber engine 20. The soup container engine recirculation valve 26 is designed to allow the recirculation of soup from the bottom of the soup container to the top of the soup container promoting blending. The soup container engine drain valve 23 may be designed to manually be opened during cleaning operations to allow drainage of any fluids in the soup container engine discharge pipe 18.

The heating chamber engine 20 receives soup flow from the soup container engine dispensing valve 17 and moves the soup to the heating chamber engine 20 cylinder where the soup is heated to serving temperature by the heating chamber 19. The heating chamber engine 20 piston is in the normal retracted position and extends to push the soup to the serving container 21 when the soup reaches serving temperature. A temperature sensor or a timer may signal the soup reaching the serving temperature.

The heating chamber engine valve 27 opens at the same time as the heating chamber engine 20 piston begins to extend to allow the flow of the soup from the cylinder to the serving container 21. When the cold soup flows through the soup container engine dispensing valve 17, the heating chamber engine 20 intake generates a swirl action that creates a turbulent flow that increases the efficiency of the soup heating and blending operation. When the heated soup flows through the heating chamber engine valve 27 as it is being dispensed, the heating chamber engine 20 piston pushes the heated soup through the heating chamber engine valve 27 and wipes the heating chamber engine 20 cylinder walls leaving the chamber empty and clean for the next soup serving to be heated and preventing buildup of heated soup residue in the heating chamber engine 20 cylinder. After the hot soup is served rinse water may be introduced in the heating chamber engine 20 cylinder for clean rinsing between servings. The heating chamber engine 20 piston may dispense the rinse water to the drain 5. The rinse may only be initiated when a period of time is available between servings. That is, when multiple servings are processed one after the other in a continuous series, rinsing may not be necessary between servings. Optionally, the heating chamber engine 20 may be cleaned by heating to an elevated temperature to kill all the bacteria that may be present.

The heating chamber 19 increases the temperature of the soup (hot soups) from a cold storage (refrigerated) temperature, for example, between 34° F. to 40° F., to the "ready to serve" temperature, for example, a temperature in a range from 190° F. to 205° F.

The container tray 22 is designed to hold the serving container 21, such as a cup or bowl in place during the dispensing operation. The heating chamber shield 24 is designed to protect the operator from the heat and also to prevent tampering with the heating chamber engine 20. The drain 5 is designed to contain and drain spills, to drain rinse water and to drain the cleaning fluids during the machine cleaning operation.

The cabinet 3 houses the electrical instrumentation and control 2, the refrigeration pack 4, the container tray 22, the drain 5, the serving container 21, the water supply tube 11, the temperature sensor and control 12, the heating chamber shield 24, the soup prep and dispensing module access door 25, the user interface display 28, the soup preparation and dispensing module 6, and the like.

The number of soup prep and dispensing modules 6 in the cabinet 3 may be determined by the number of different types of soup to be served and/or by the number of soup prep and dispensing modules 6 dispensing the same type of soup to be served. FIG. 4A shows a plan view of four soup prep and dispensing modules 6 in a cabinet 3 according to the second exemplary embodiment. FIG. 4B shows a front view of the four soup prep and dispensing modules 6 in the cabinet 3 of FIG. 4A. An input module and display of the electrical instrumentation and control 2 may be located on the front of each module 6 as shown in the illustrated embodiment of FIG. 4B or one display and input of the electrical instrumentation and control 2 may operate all modules 6 in a soup preparation and dispensing machine apparatus 1 cabinet 3.

Figure 7:
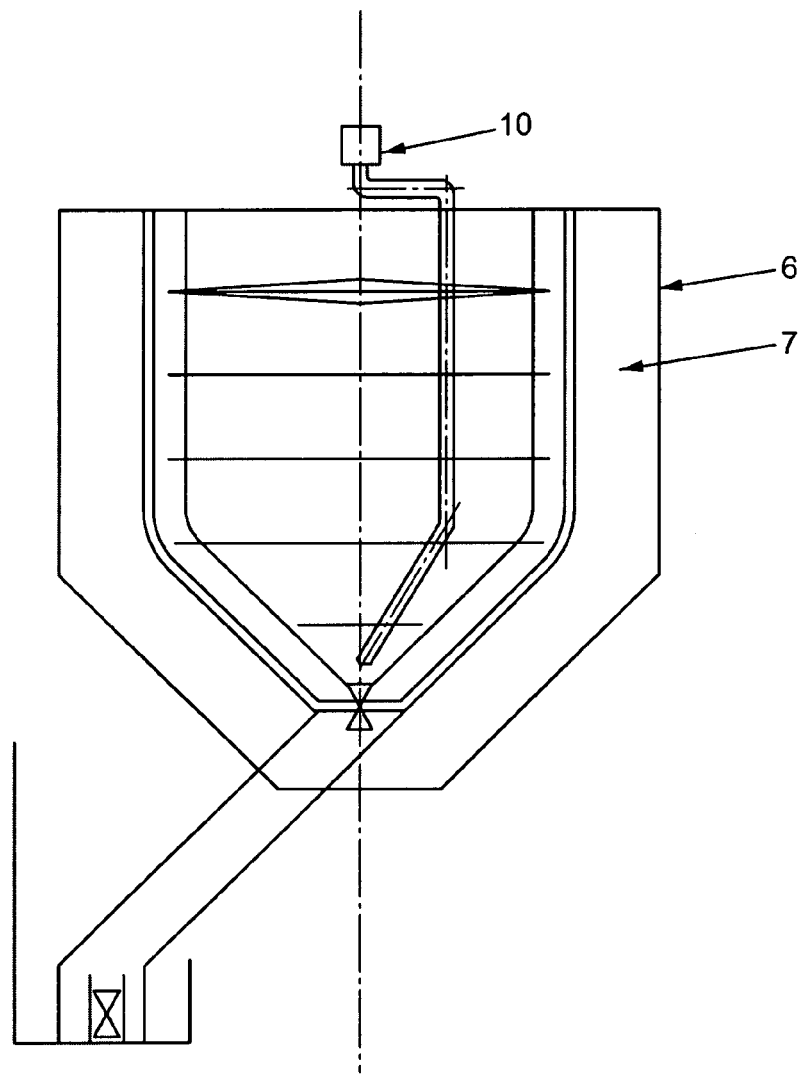
FIG. 7 is a cross-sectional view showing a soup preparing and dispensing machine (SPDM) apparatus showing a gravity feed according to a third exemplary embodiment of the present invention.

FIG. 7 shows a third exemplary embodiment of the soup prep and dispensing module 6'. In the exemplary embodiment of the soup prep and dispensing module 6' shown in FIG. 7, the soup container agitator and wiper 9' may have a hook-shaped vertical axis and the soup container engine discharge pipe 18' may dispense soup by a gravity feed process.

The SPDM apparatus 1 according to the illustrated exemplary embodiments handles (processes) soup made from scratch, can, condensed, etc., hot or cold and may handle other food fluids, such as milk, tea, coffee, wine, etc. An inert gas such as nitrogen may cover fluids in the soup container 8 of the SPDM apparatus 1 to extend the freshness of the soup container 8 contents. The SPDM apparatus 1 according to the exemplary embodiments cooks, blends, re-circulates, provides cool storage and auto dispenses hot or cold, most types of soup or other food fluids including beverages ready for serving and consumption (eating, drinking). The soup container agitator and wiper 9 and motor 10 allows stop/start, clockwise and counter clockwise, and change in RPM. The agitator and wiper 9 may have an adjustable or built-in blade pitch. The soup container agitator and wiper 9 generates "down flow" during dispensing using a combination of blade pitch and rotation. The soup container 8 can be a pressure vessel for rapid cooking and cleaning.

The SPDM apparatus 1 according to the exemplary embodiments provides a hot or cold dispensing system. The heating chamber engine 20 may provide a turbulent flow generator to improve heat transfer of the serving fluid. A high speed agitator may be included in the heating chamber engine to provide foamy or whipped products such as cappuccino. In addition, other food or beverage products may be added to the dispensed serving, such as by other modules 6 of the SPDM apparatus 1 or automatically within one SPDM module 6. The SPDM apparatus 1 according to an alternative exemplary embodiment has the soup preparation and dispensing module 6 with the exception of the heating chamber engine 20 inside a cooled and insulated refrigerator housing.

The SPDM apparatus 1 according to the exemplary embodiments is self cleaning by implementing an agitator and recirculating system with water cleaning solution, and draining/dispensing systems with sterilizing. The SPDM apparatus 1 according to the exemplary embodiments provides a modular construction allowing a machine to have from one to "X" number of modules and capacities. The SPDM apparatus 1 according to the exemplary embodiments provides an interface with restaurant data entry systems for ordering servings and tracking servings dispensed. The SPDM apparatus 1 according to the exemplary embodiments may be portable for field operations such as catering, street vendors, military applications, etc. The SPDM apparatus 1 may be supplied with electrical power, water and drain or these components can be included in the SPDM apparatus 1 according to the exemplary embodiments. For example, a power supply may be 120/220V 50/60 Hz 15/30 A power supply.

The SPDM apparatus 1 according to the exemplary embodiments provides automatic dispensing with multiple servings capability such as using a turn table, conveyor belt, drop-down servings, etc. The SPDM apparatus 1 according to the exemplary embodiments includes computer based instrumentation and control systems, and hardware and software that can handle machine operations based on food recipes, beverage recipes, cooking, blending, re-circulating, dispensing hot or cold servings, cleaning, remote data entry and interfacing such as through a local area network (LAN), Ethernet, etc., operator interface, etc. The SPDM apparatus 1 according to the exemplary embodiments dispenses a healthy product, in an environmentally conscientious way by preventing waste. The SPDM apparatus 1 according to the exemplary embodiments is safe, tamper resistant, prevents bacteria formation, is labor saving by making soup once a week while providing automatic dispensing of fresh hot and/or cold soup and other liquid foods and beverages.

Figure 5:
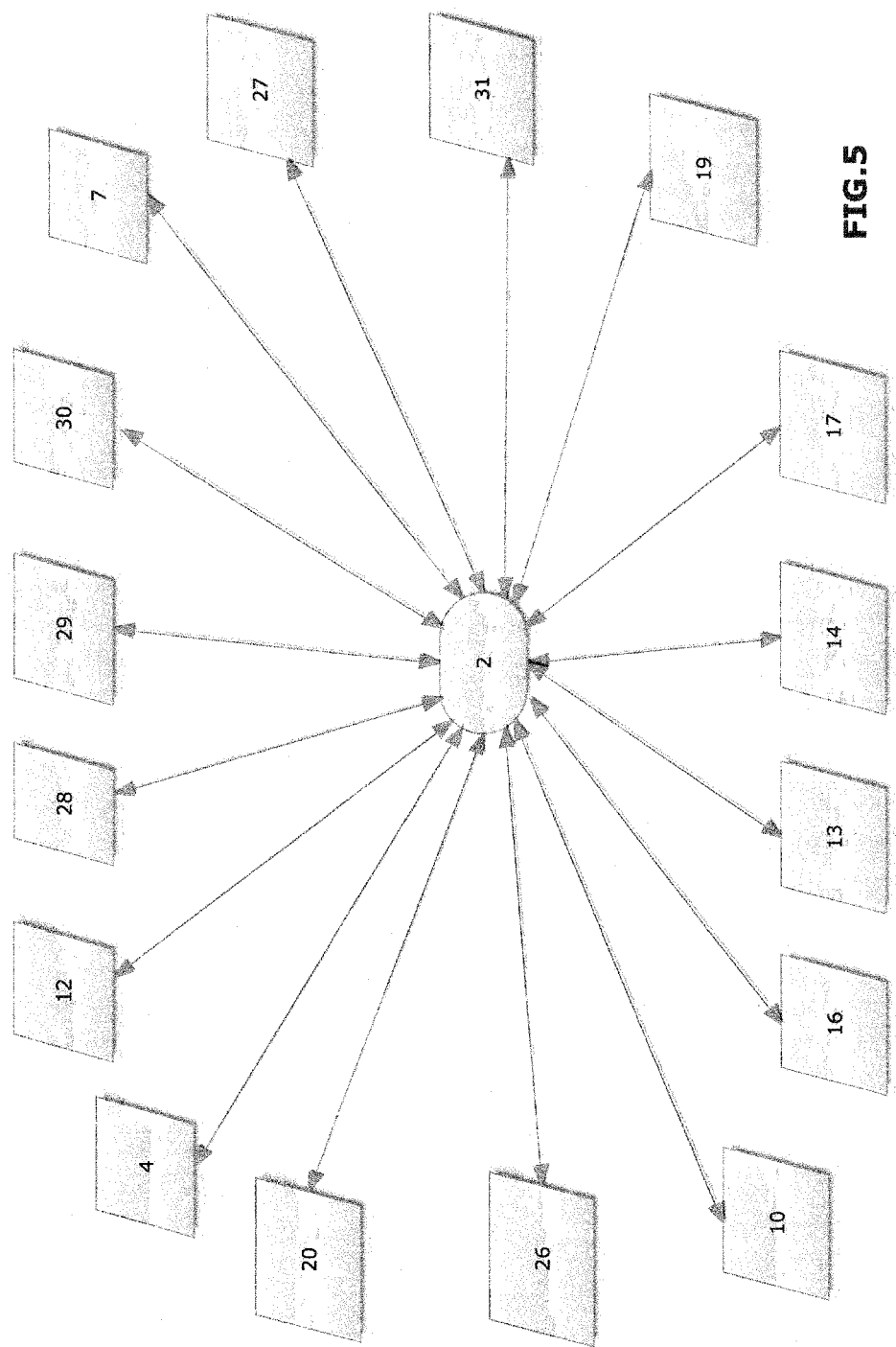
FIG. 5 is a flow diagram of the electrical instrumentation and control of the SPDM according to the first exemplary embodiment of the present invention.

FIG. 5 shows a flow diagram of the electrical instrumentation and control of the SPDM apparatus 1 according to the first exemplary embodiment of the present invention. The electrical instrumentation and control 2 may receive input signals from and/or control the refrigeration pack 4, the heating and cooling pack 7, the soup container agitator and wiper motor 10, the temperature sensor and control 12, the user interface display 28, the soup container engine 16, the soup container engine dispensing valve 17, the heating chamber 19. The electrical instrumentation and control 2 may also receive input signals from and/or control the soup container intake valve 13, the soup container engine discharge valve 14, the soup container recirculation valve 26, the heating chamber shield sensor 29, the serving container sensor 30, the heating chamber engine 20, the heating chamber engine valve 27, the serving temperature sensor 31, as well as other components, valves, members and elements of the SPDM apparatus 1. The electrical instrumentation and control 2 may operate the components previously described to operate as described and therefore repetitive description thereof may be omitted here.

When the electrical instrumentation and control (controller) 2 receives an input to prepare a batch of soup, the controller may send a heating signal to the heating and cooling pack 7, a water supply signal to the water supply tube 11 to provide a volume of water, and a stifling signal to the soup container agitator and wiper motor 10. The controller 2 may receive a temperature signal from the temperature and sensor control 12 and adjust the heat of the heating and cooling pack 7 in response to the temperature signal. The controller may include a timer (not shown) and send a cooling signal to the heating and cooling pack 7 after a set period of time. The heating and cooling pack 7 may heat continuously or at various temperatures for various times in response to the heating signal. The soup container agitator and wiper motor 10 may stir continuously or at various speeds and forward and reverse directions in response to the stirring signal.

When the batch soup is prepared and cooled, the controller 2 may send a cold storage signal to the heating and cooling pack to maintain the soup container 8 at a refrigerated temperature. The controller may control the refrigeration pack 4 to supply the cooling to the heating and cooling pack 7. The controller 2 may receive a temperature signal from the temperature and sensor control 12 and adjust the cooling of the heating and cooling pack 7 in response to the temperature signal. The controller 2 may send a cold storage stir signal to the soup container agitator and wiper motor 10 to stir the refrigerated prepared soup at a speed to maintain a well blended soup for rapid dispensing.

When the controller 2 receives a priming operation request, input by a user through a button, remote controller, touch screen, voice command, or the like, such as input to the operator interface display 28, the controller 2 sends a piston down stroke signal to the soup container engine 16 to initiate the priming operation as described above. Optionally, the controller 2 can automatically prime the soup container engine discharge pipe 18 when the batch soup is prepared and cooled. In the priming operation, the controller 2 can send a recirculation signal to the recirculation valve 26 to open and the soup pumped into the soup container engine discharge pipe 18 returns to the soup container 8 when the soup prep and dispensing module 6 is primed and stifling the soup in a cold storage mode.

When the controller 2 receives a serving request signal input by a user through a button, remote controller, touch screen, voice command, or the like, such as input to the operator interface display 28, the controller 2 sends a serving size signal to the soup container engine 16. The soup container engine 16 draws the soup container engine piston 15 back from the normal position to fill the piston chamber with an amount of soup equal to the requested serving size in response to the serving size signal. The controller 2 may receive a serving container sensed signal from the serving container sensor 30 before dispensing the soup serving. When no container sensed signal is received, the controller 2 may display a request to the user to place a serving container 21 on the container tray 22. The request may be displayed as a message on the operator interface display 28.

The controller 2 controls recirculation valve 26 to be closed, soup container engine dispensing valve 17 to be opened, piston 15 to travel forward toward normal position and heating chamber 19 to heat the portion of soup dispensed from the soup container engine dispensing valve 17 equal to the volume of the serving request. As the portion of soup flows into the heating chamber engine 20 it is heated to the set serving temperature according to a serving temperature signal sent from the controller 2 to the heating chamber 19 in response to an input from the user or an automatically programmed serving temperature.

The controller 2 receives a heated serving signal from a heating chamber engine 20 serving temperature sensor 31 or a heating timer signal to indicate the soup serving in the heating chamber engine 20 cylinder is heated and ready to be dispensed. The controller 2 opens the heating chamber engine valve 27 in response to the heated serving signal and dispenses the soup serving into the serving container 21. The controller signals the heating chamber engine 20 piston to push the soup out of the heating chamber engine 20 cylinder into the serving container 21 when the heating chamber engine valve 27 is open.

The controller 2 may control the components as previously described to automatically rinse the heating chamber engine 20 and/or automatically clean the SPDM apparatus 1 when the batch of soup has been depleted or expired. The controller 2 may sterilize the heating chamber engine 20 by heating the heating chamber engine 20 to a high temperature.

The controller 2 may be embodied directly in hardware, in a software module executed by a processor, or in a combination of the two to implement the methods or algorithms described in connection with the embodiments disclosed herein. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to a processor of the controller 2 such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The input to prepare a batch of soup may be preset instructions stored in a non-transitory computer memory. The instructions may include preparation temperature, time, stir speed, cold storage temperature, cold storage stir speed, dispensing temperature, price per serving, etc. Optionally, one or more of the parameters may be manually entered. Likewise, the cleaning process parameters may be preset, partially preset or manually entered, for example, heated dry on/off may be a preset option.

Figure 6:
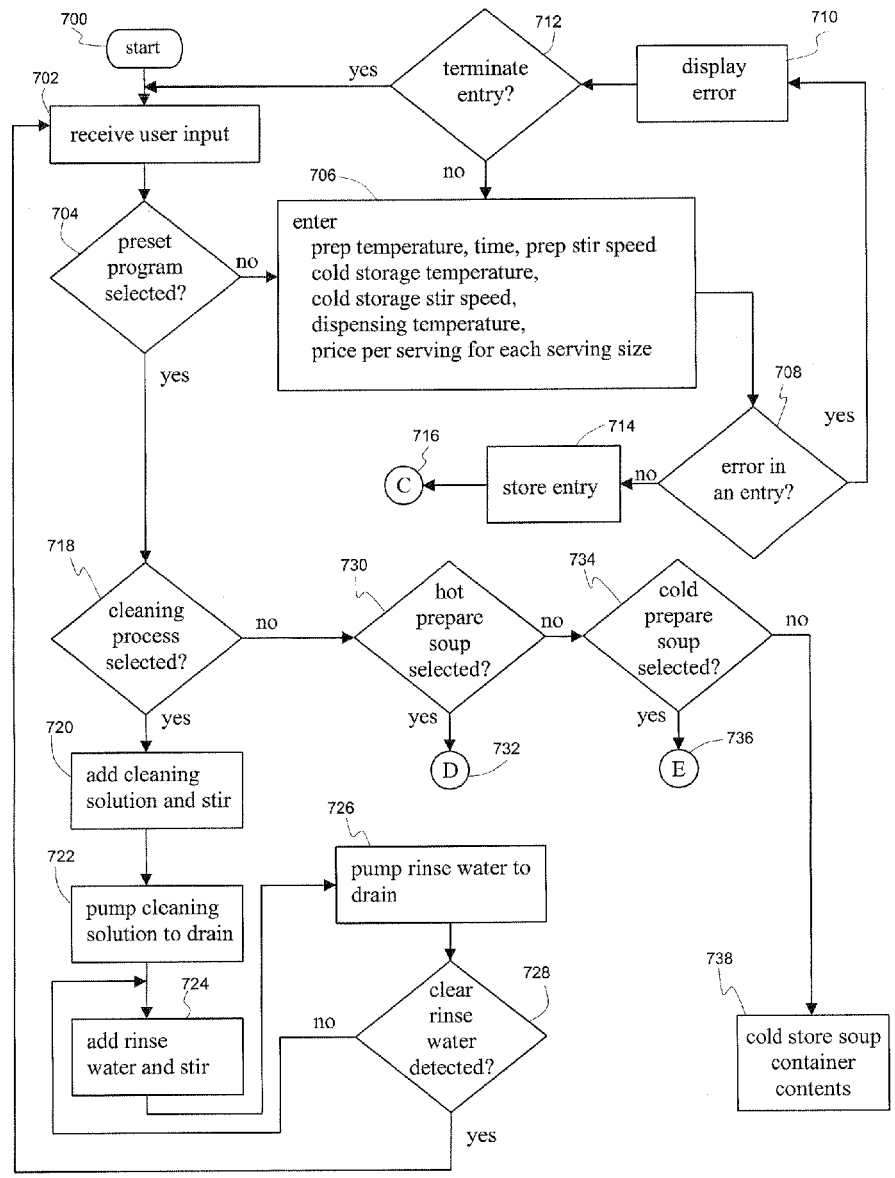
FIG. 6 is a flow chart of an exemplary embodiment of a generic process of the soup preparing and dispensing machine (SPDM) apparatus according to an exemplary embodiment of the present invention.

FIG. 6 shows a flow chart of an exemplary embodiment of a generic process of the soup preparing and dispensing machine (SPDM) apparatus 1 according to an exemplary embodiment of the present invention. At operation 700 the controller may be booted up and software loaded from non-transitory memory, etc. At operation 702 the controller 2 may stand-by for an input from a user through the operator interface display 28, a remote controller, other input device such as a keyboard or an internet/intranet link. In operation 704 a preset program may be selected. Preset programs may include cleaning operations, preset recipes for hot or cold soup or the like. In operation 704 a manual program may be selected where a user may enter recipe parameters such as preparation time, temperature and stir speed in operation 706. All or some portion of the recipe parameters as described above may be manually entered in operation 706 and automatic or default parameters may be supplied from the controller 2 memory to supplement the manually entered parameters. The controller 2 may implement an error checking at operation 708. If there are no errors, the parameters may be stored at operation 714 to become a preset recipe. The recipe may be implemented at "C". The controller 2 may display an error at operation 710 when an error is entered in the recipe parameters at operation 706. The user may be given the option to terminate the manual entry at operation 712 or to correct the erroneous entry at operation 706.

If a preset program is selected at operation 704, the controller may display a message to the user on the operator interface display 28 or on a computer terminal over an internet connection requesting further input as to which preset program to implement. For example, at operation 718 a cleaning process may be selected, at operation 730 a hot soup preparation process may be selected and at operation 734 a cold soup preparation process may be selected. When the cleaning process is selected at operation 718 the controller 2 may automatically send a signal to add cleaning solution to the soup container 8, heat, stir and re-circulate the cleaning solution at operation 720. The cleaning operation may then proceed automatically in operation 722 where the cleaning solution is drained from the SPDM apparatus 1 and rinse water is added, heated, stirred, re-circulated and drained in operations 724 and 726. The cleaning water sensor may detect when the rinse water is clear at operation 728 and when it is not clear additional rinsing can be executed in operations 724 and 726. When the cleaning process is completed the controller 2 returns to operation 702. A clean indicator such as a light or tone may signal a user that the SPDM apparatus 1 or module 6 is ready to prepare a batch of soup or beverage.

When the hot prepare soup is selected in operation 730 the controller 2 may implement the selected hot prepare recipe at "D". When the cold prepare soup is selected in operation 734 the controller 2 may implement the selected cold prepare recipe at "E". If the operator selects "no" in operation 734 the controller 2 may enter a default mode such as cold storing the contents of the soup container 8 in operation 738. The soup preparation recipes at "C", "D", and "E" may be implemented as illustrated in the selection and cooking process shown in FIG. 8. Throughout the SPDM apparatus 1 operation, the operator interface display 28 may display the operation mode of the SPDM apparatus 1 components, recipe parameters that have been executed and that will be executed next, temperature and level of contents in the soup container and the like.

Figure 8:
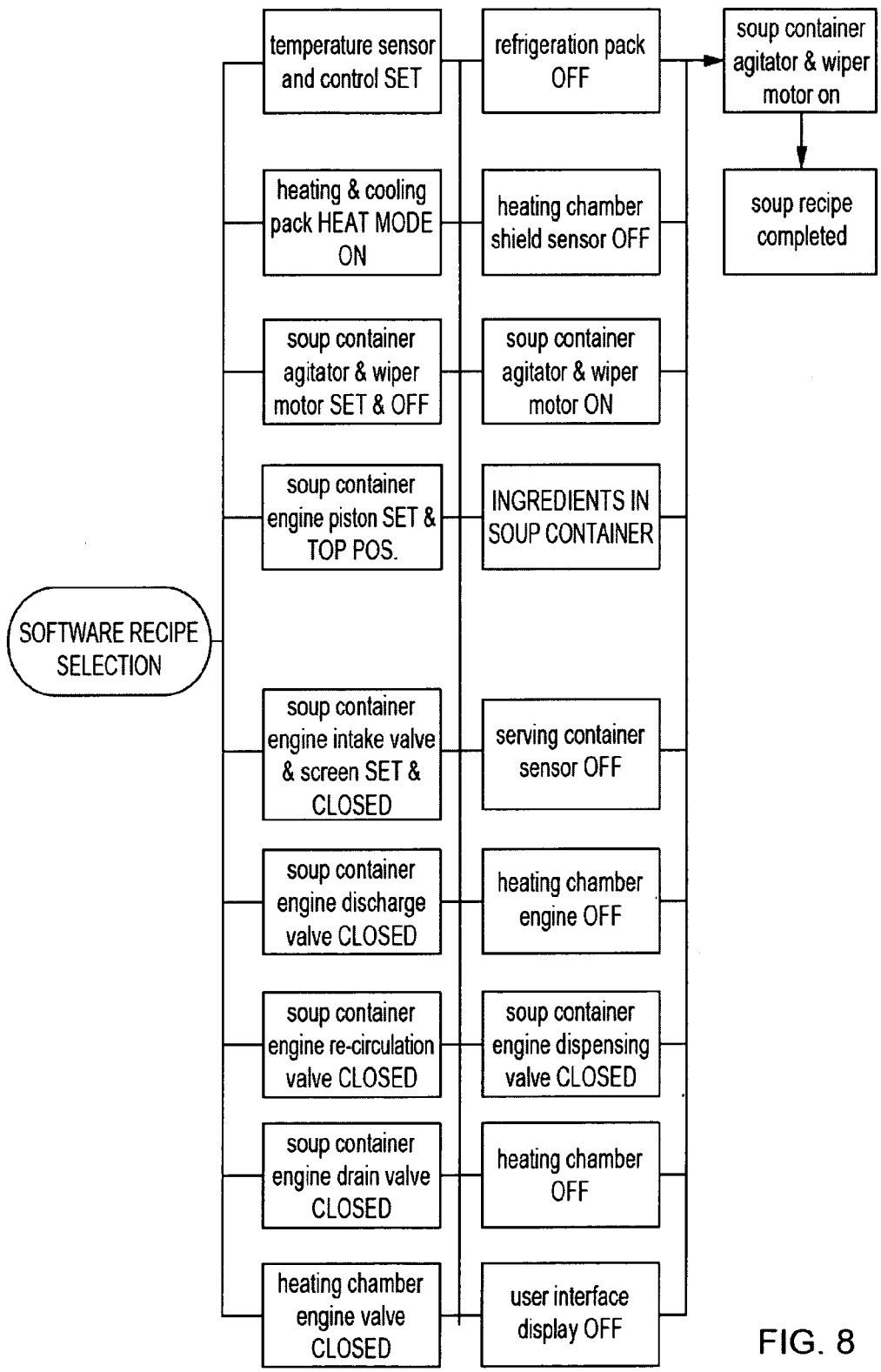
FIG. 8 shows a flow diagram of a selection and cooking process of the SPDM apparatus according to an exemplary embodiment of the present invention.
Figure 9:
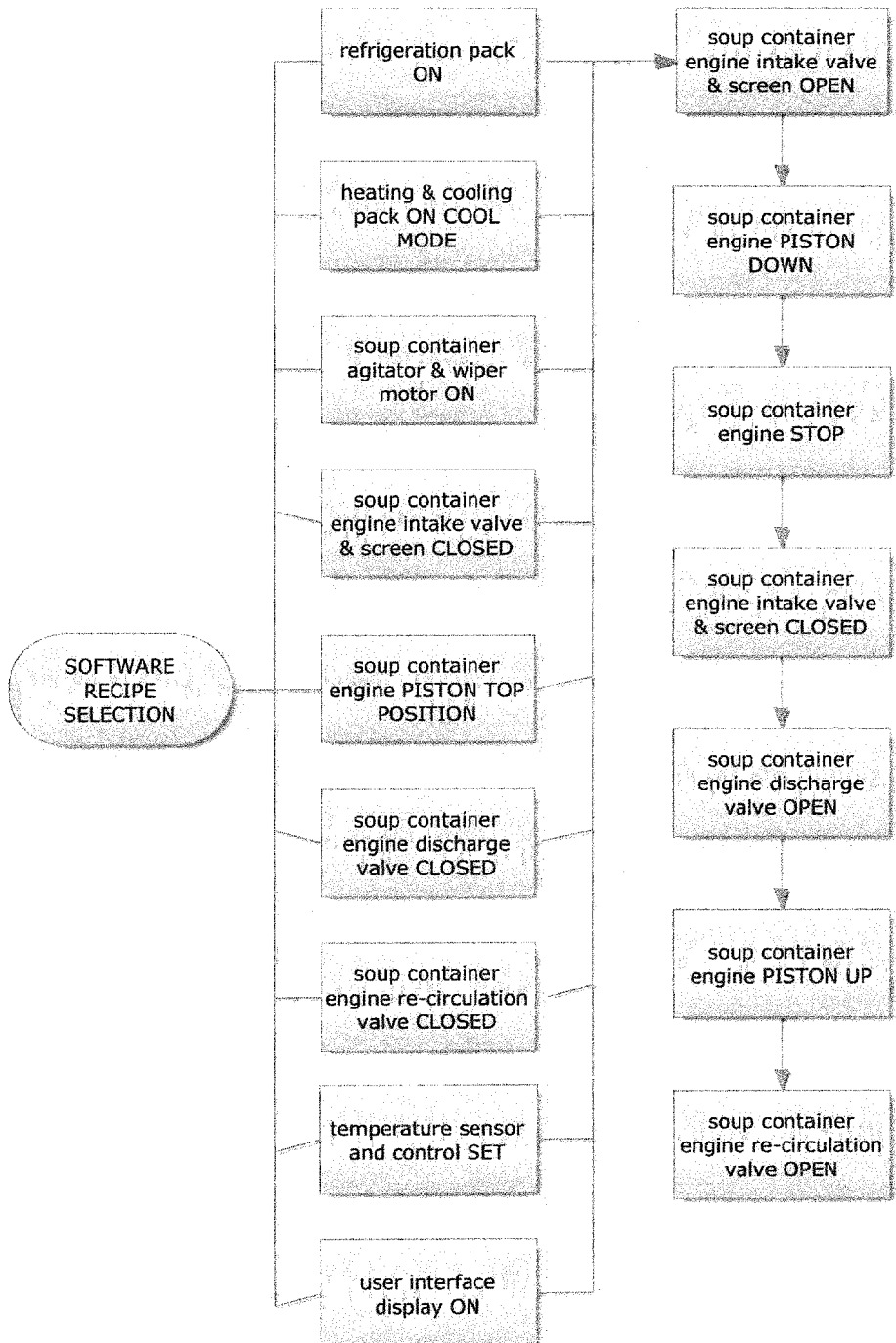
FIG. 9 shows a flow diagram of a selection and cool storage process of the SPDM apparatus according to an exemplary embodiment of the present invention.
Figure 10:
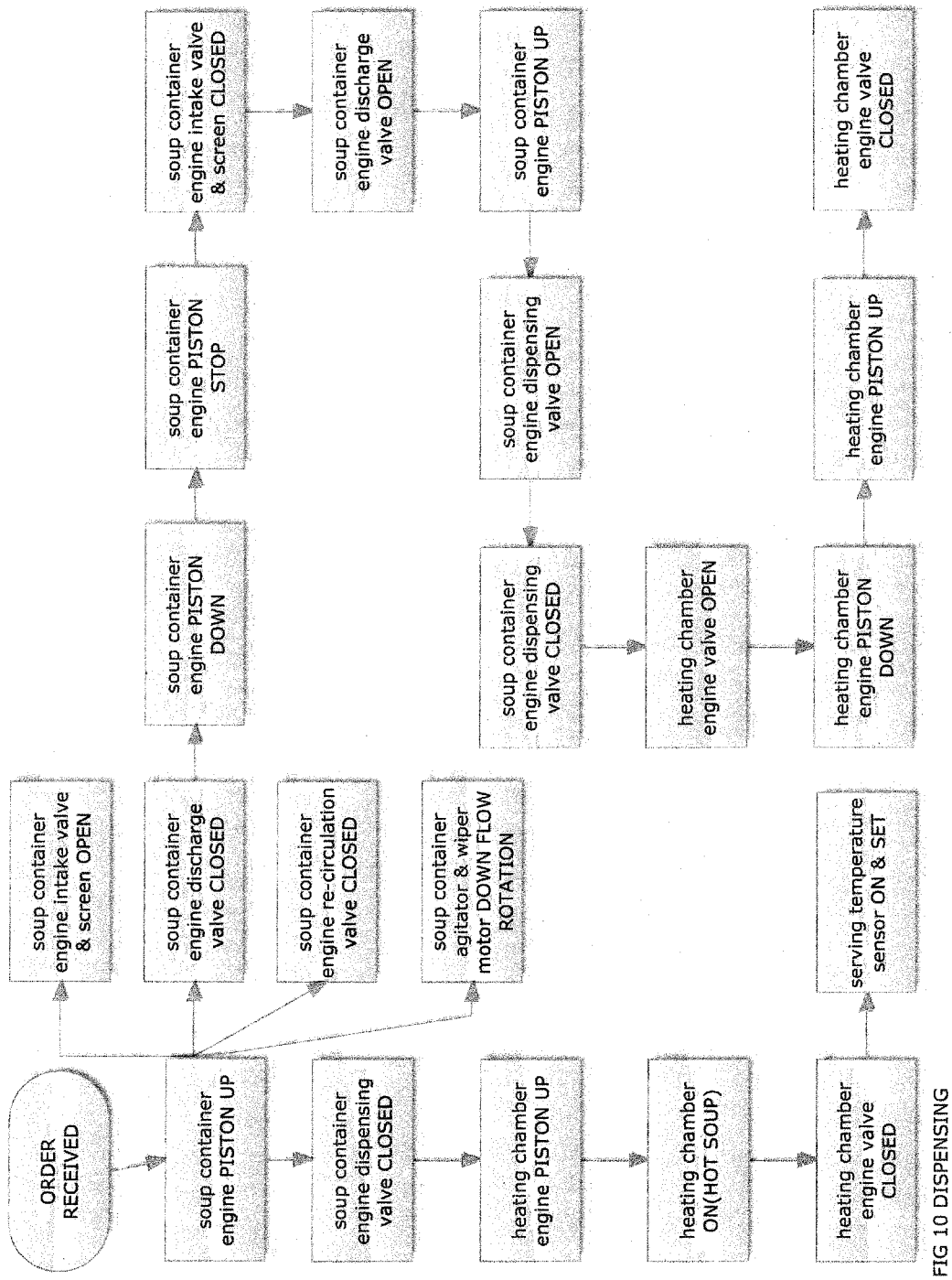
FIG. 10 shows a flow diagram of a selection and dispensing process of the SPDM apparatus according to an exemplary embodiment of the present invention.

FIG. 8 shows a flow diagram of a selection and cooking process according to an exemplary embodiment of the present invention. FIG. 9 shows a flow diagram of a selection and cool storage process according to an exemplary embodiment of the present invention. FIG. 10 shows a flow diagram of a selection and dispensing process according to an exemplary embodiment of the present invention.

FIG. 8 shows an embodiment of the selection and cooking process implemented by the controller 2 in the SPDM apparatus 1 in response to an input by a user in the operator interface display 28. The input may request a preset cooking process (recipe), a manually modified preset recipe or a manually entered recipe. The controller 2 may implement the cooking process with preset instructions stored in a memory device, manually entered instructions, or a combination thereof. The manually modified preset recipe may be stored in memory by the controller 2 as a new preset cooking process.

FIG. 9 shows an embodiment of the selection, cooling and cool storage process implemented by the controller 2 in the SPDM apparatus 1 in response to an input by a user in the operator interface display 28. The input may request a preset cooling process, a manually modified preset cooling process or a manually entered cooling process. The controller 2 may implement the cooling process with preset instructions stored in a memory device, manually entered instructions, or a combination thereof. The manually modified preset cooling process may be stored in memory by the controller 2 as a new preset cooling process.

FIG. 10 shows an embodiment of the selection and dispensing process implemented by the controller 2 in the SPDM apparatus 1 in response to an input by a user in the operator interface display 28. The input may request a preset dispensing process, a manually modified preset dispensing process or a manually entered process. The controller 2 may implement the dispensing process with preset instructions stored in a memory device, manually entered instructions, or a combination thereof. The manually modified preset dispensing process may be stored in memory by the controller 2 as a new preset dispensing process.

Figure 12:
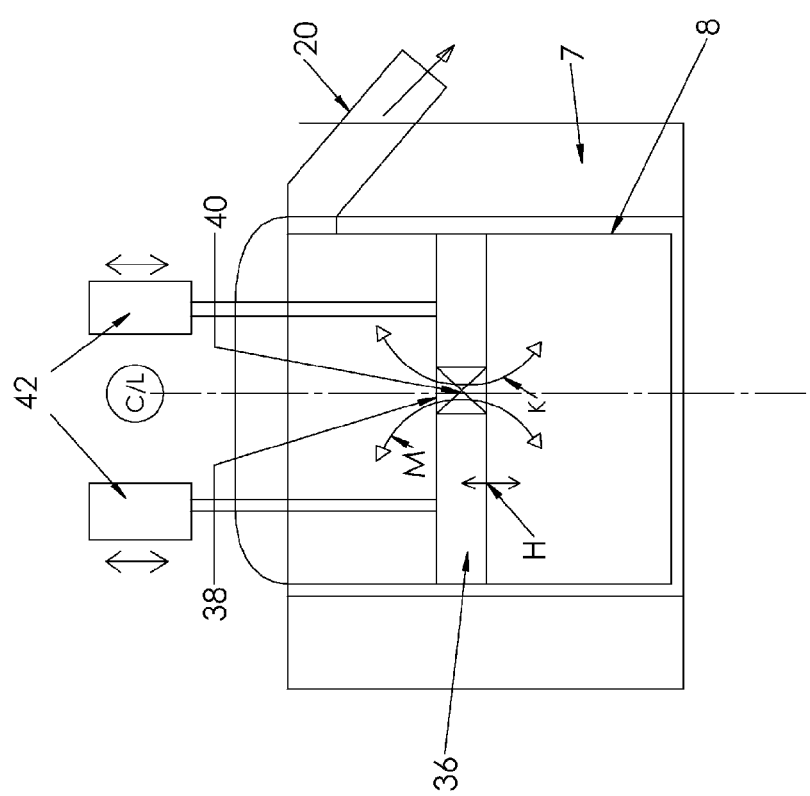
FIG. 12 is a cross-sectional view showing a soup preparing and dispensing machine (SPDM) apparatus showing a piston in soup container according to a fourth exemplary embodiment of the present invention.

FIG. 12 is a cross-sectional view showing a soup preparing and dispensing machine (SPDM) apparatus showing a piston in soup container according to a fourth exemplary embodiment of the present invention. In the fourth exemplary embodiment, a piston 36 has a hole 38 in its center or a plurality of holes distributed in the piston 36 such that liquid (soup, beverage, etc.) above the piston 36 in the soup container 8 is in communication with liquid below the piston 36 in the soup container 8. The piston 36 having the hole 38 therethrough in the center with a valve 40 travels up and down the soup container 8 indicated by arrows "H", re-circulating and agitating the soup container contents 8 that travels through the piston hole 38 indicated by arrows "M" and "K". As the piston 36 moves upward, the soup moves downward "K" through the hole 38 and as the piston 36 moves downward, the soup is pushed through the hole 38 with force "M". A piston motor 42 may move the piston 36. The other components of the fourth exemplary embodiment may be the same as the components described above with regard to the previously described exemplary embodiments. In the fourth exemplary embodiment, soup may be drawn from the top or bottom of the soup container 8.

In a fifth exemplary embodiment of a SPDM apparatus the heating and cooling pack 7 for chilling and refrigeration, and heating of the soup container 8 (kettle) may use propane, natural gas or other source not dependent on electricity. Likewise, the heating chamber 19 may use propane, natural gas, or the like. In such an embodiment chilling fans may not be used. The soup container engine 16 or another type of pump to pump the soup from the soup container 8 and all the valves (e.g., soup container engine intake valve 13, soup container engine discharge valve 14, soup container engine dispensing valve 17, soup container engine recirculation valve 26, heating chamber engine valve 27, etc.) may be manually operated. There may be no soup container agitator and wiper motor 10 to drive cutting blades (blender) and the soup container agitator and wiper 9. Instead, according to this embodiment, the blender and the soup container agitator and wiper 9 may be manually (crank) operated. There may be no automated instrumentation and control 2.

Therefore, the SPDM apparatus of the fifth embodiment may operate in remote locations, disaster areas, relief areas, and the like where no power is readily available, as well as in a self-contained unit for mobile vendors, sidewalk vendors and the like.

Figure 13:
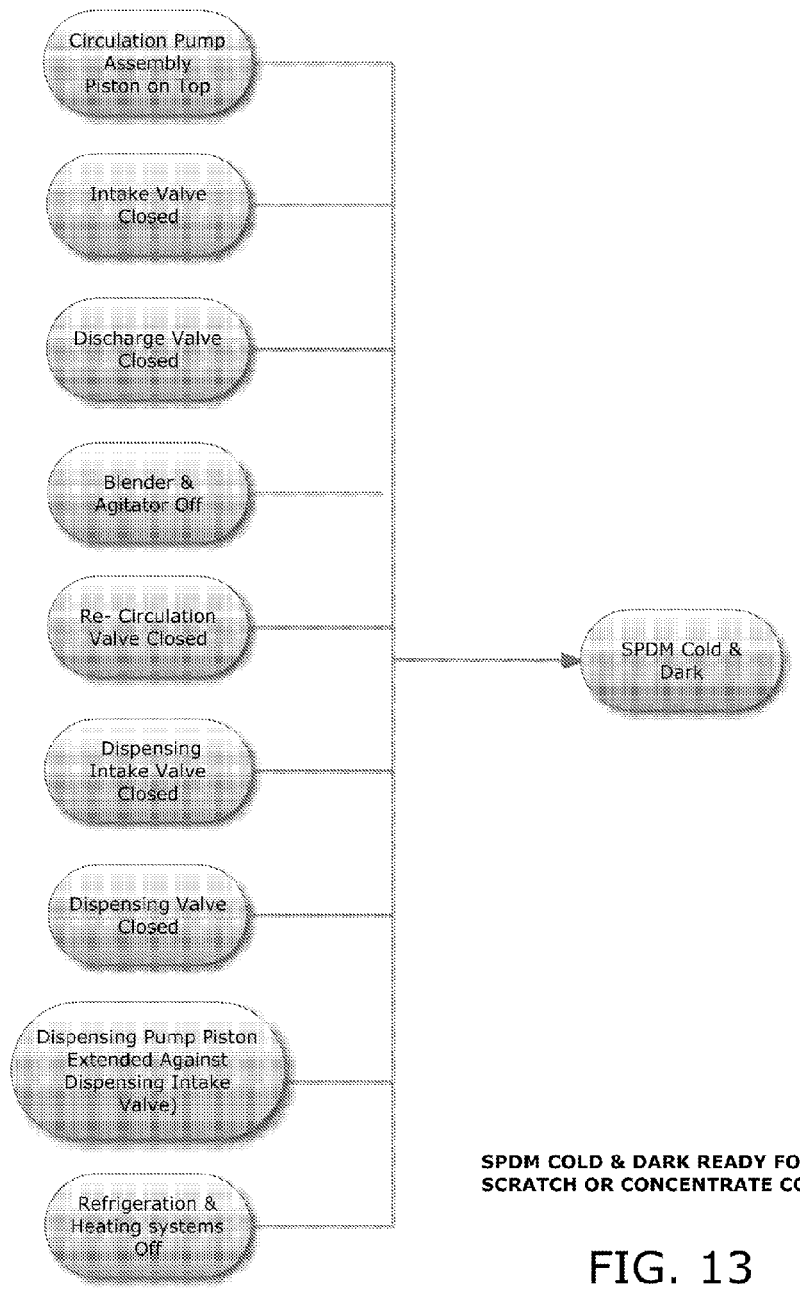
FIG. 13, FIG. 14, FIG. 15, FIG. 16, FIG. 17, and FIG. 18 show process flowcharts of exemplary embodiments of methods of operating an exemplary embodiment of a soup preparing and dispensing machine (SPDM) apparatus.

FIG. 13 shows a process flowchart of an exemplary embodiment of a process for a SPDM apparatus in a cold and dark state ready for a chef to batch prepare soup.

Figure 14:
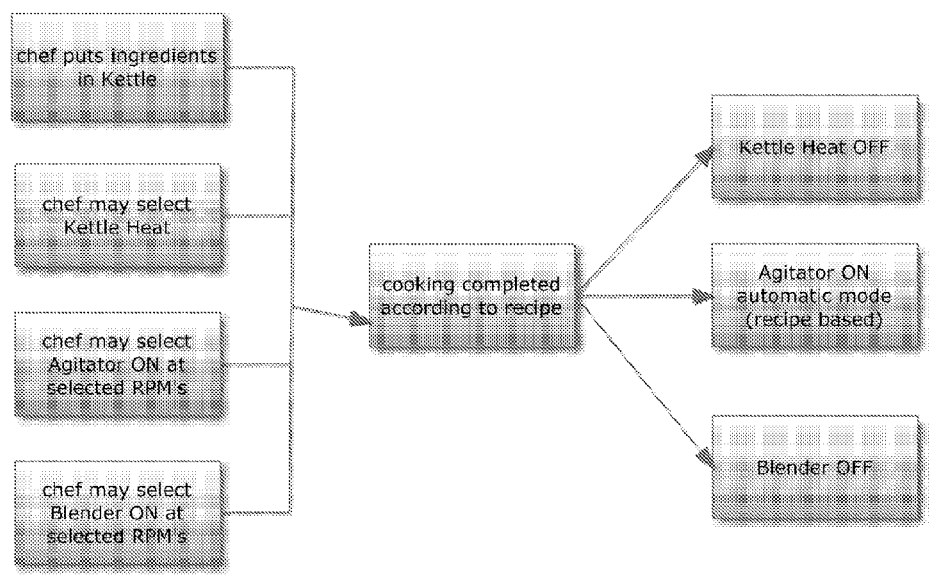

FIG. 14 shows a process flowchart of an exemplary embodiment of a process for a chef to batch prepare soup in an exemplary embodiment of a SPDM apparatus.

Figure 15:
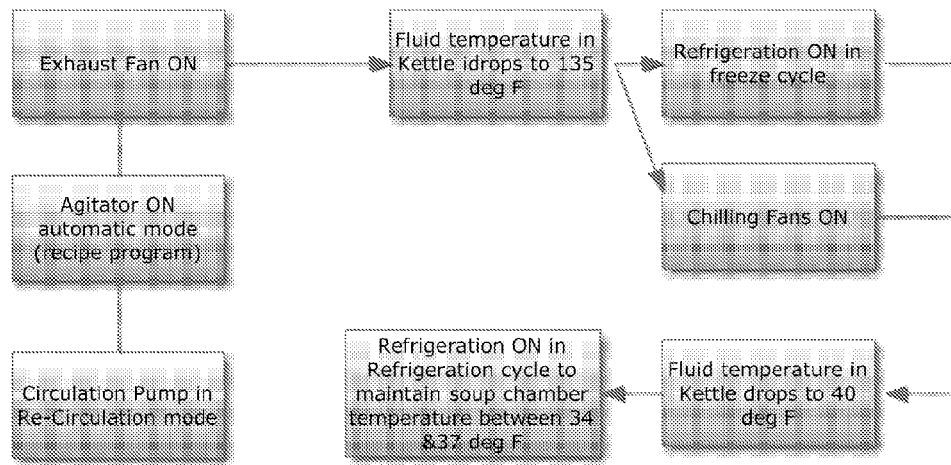

FIG. 15 shows a process flowchart of an exemplary embodiment of a process for chilling and refrigeration of a soup batch in an exemplary embodiment of a SPDM apparatus. In such a chilling and refrigeration process, the soup may be at a temperature of 200 to 135° F. at the end of the soup preparation. The soup may remain at this temperature for a period of time as necessary since very little bacteria growth occurs at this temperature. Then the soup batch may be cooled to about 135° F. by an exhaust fan, for example, and the refrigeration system and chilling fans of the heating and cooling pack 7 may cool the soup batch to about 70° F. in about 2 hours or less. Further cooling of the soup batch from about 70° F. to about 41.9° F. or less may be accomplished by the heating and cooling pack 7 in about 4 hours or less. Finally, according to this exemplary embodiment of a process, the heating and cooling pack 7 may cool the soup batch from about 41.9° F. to about 34° F. in about 2 hours or less, and maintain the soup at these cold temperatures as described previously.

Figure 16:
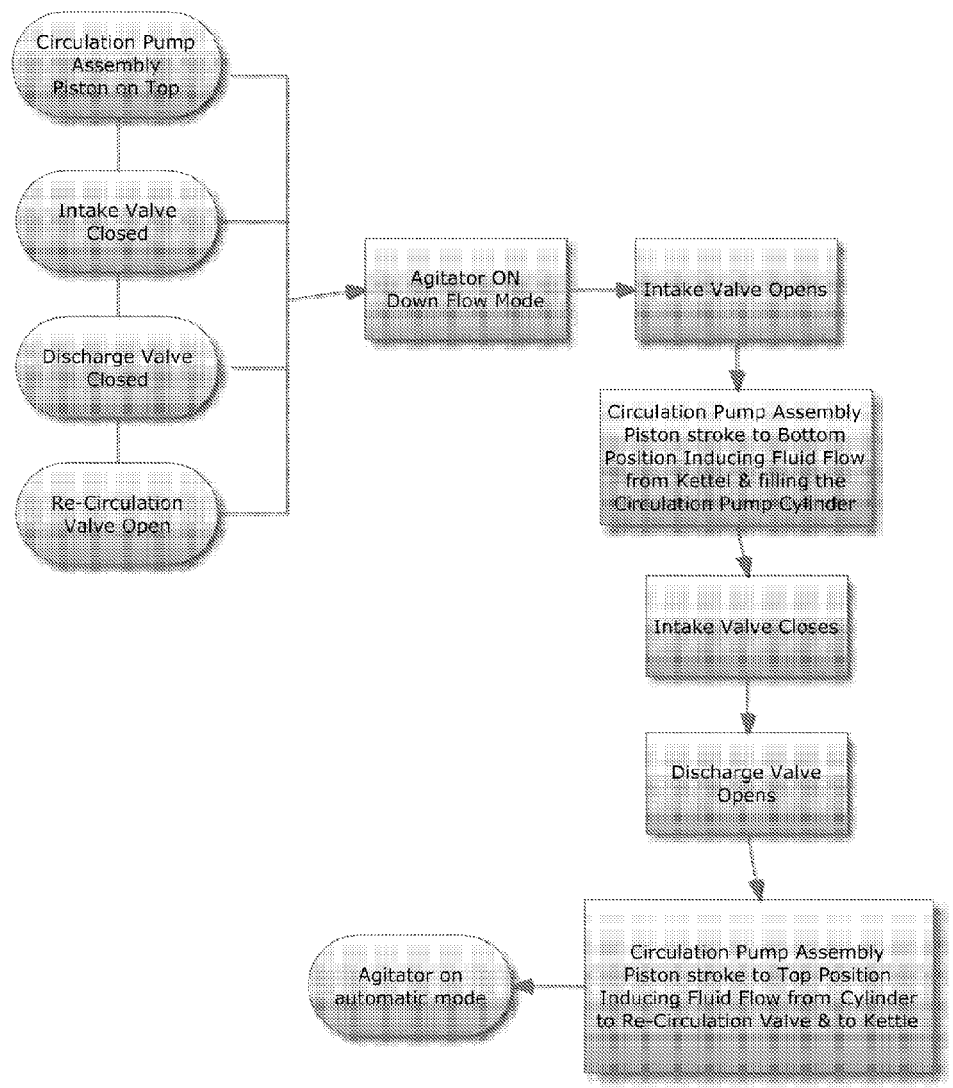

FIG. 16 shows a process flowchart of an exemplary embodiment of a process for recirculation of the soup batch in an exemplary embodiment of a SPDM apparatus.

Figure 17:
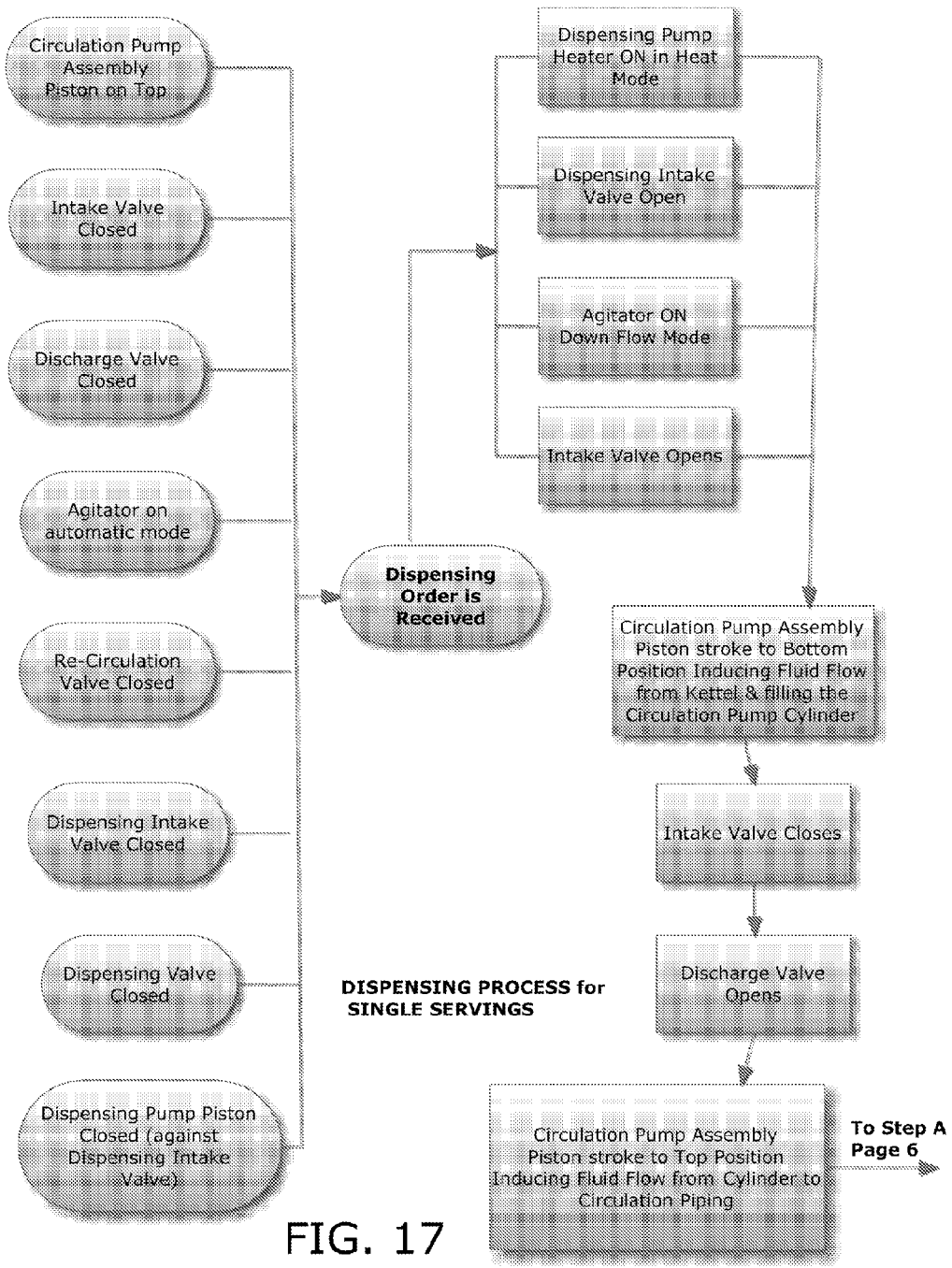
Figure 18:
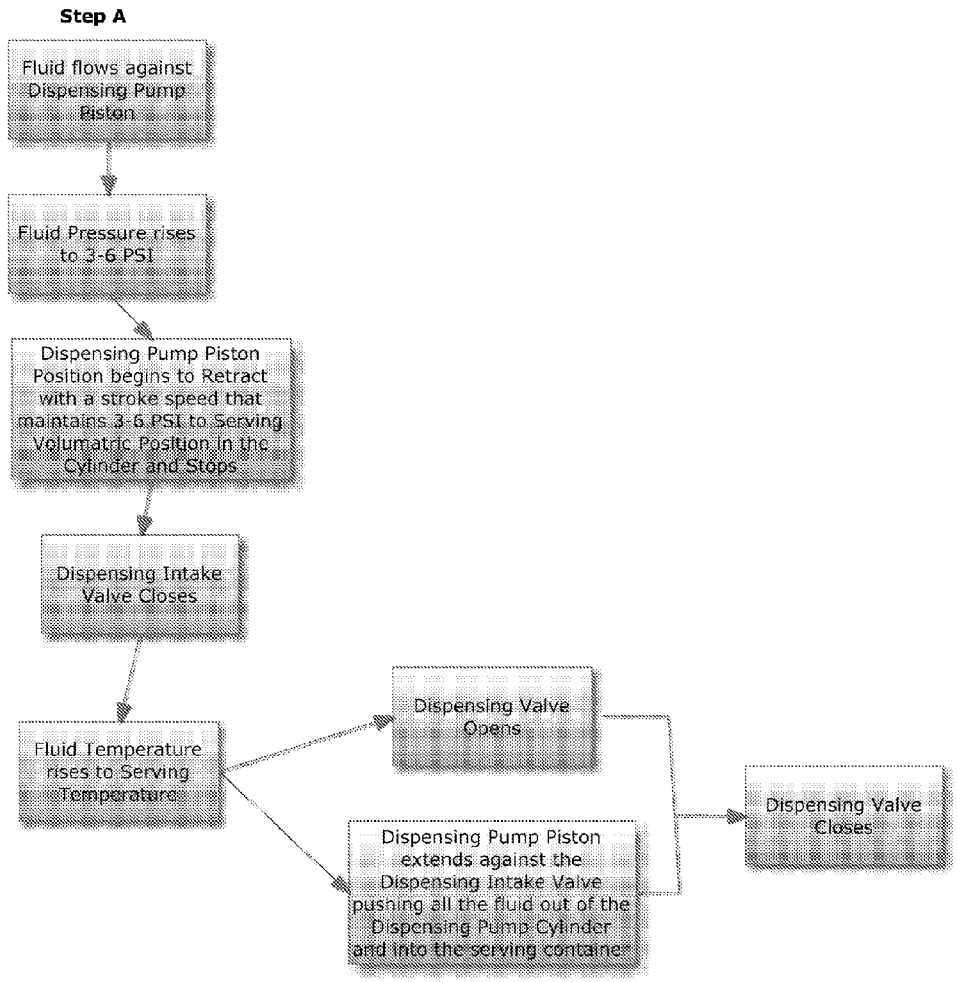

FIG. 17 and FIG. 18 show process flowcharts of an exemplary embodiment of a process for dispensing servings of soup of the soup batch in an exemplary embodiment of a SPDM apparatus. While a single serving is illustrated, it will be understood that according to various exemplary embodiments serving sizes may be single servings, multiple single servings, a serving size for multiple servings such as soup-for-two in a single serving, a taste sample size, etc., or any combination thereof.

Figure 19:
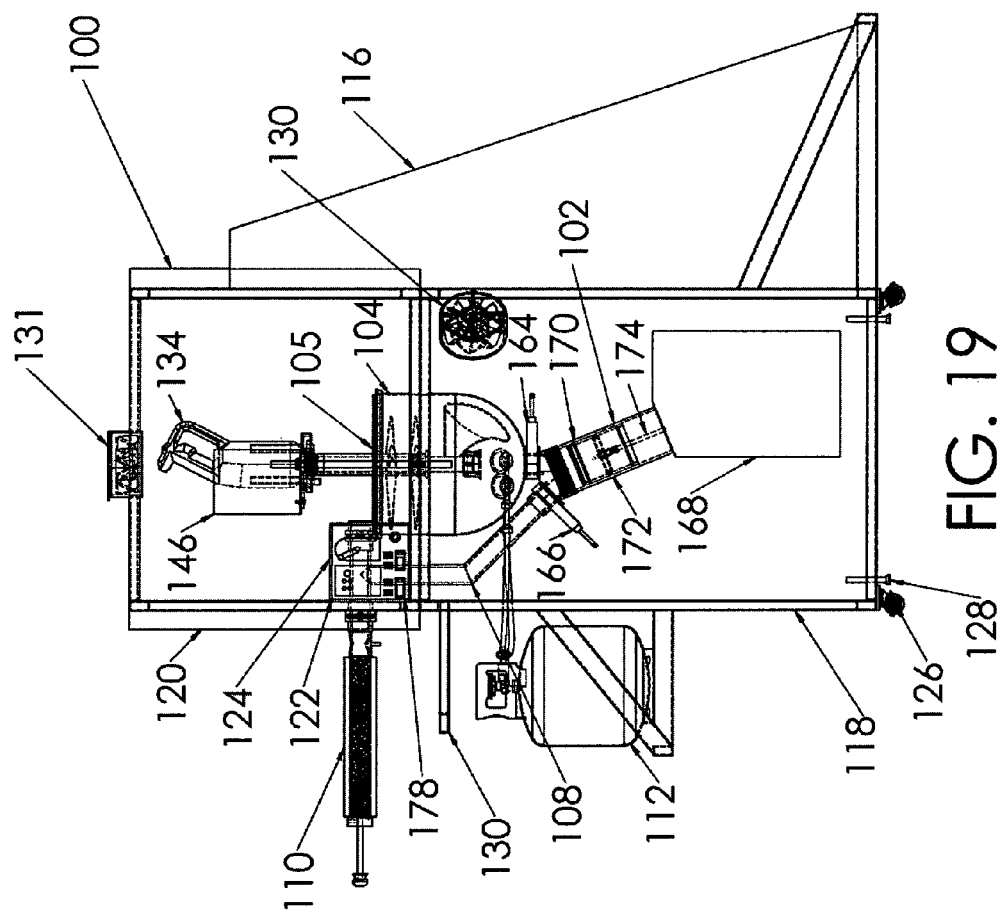
FIG. 19, FIG. 20, FIG. 21, FIG. 22, FIG. 23, and FIG. 24 show exemplary embodiments of soup preparing and dispensing machine (SPDM) apparatus and components thereof.

FIG. 19 shows a front elevation view of a sixth embodiment of the SPDM apparatus 100. FIG. 19 shows an exemplary embodiment of the SPDM apparatus components according to the sixth exemplary embodiment. FIG. 19 shows a circulation pump assembly 102, a soup container (kettle) 104, a soup container temperature sensor 105, a blender and agitator assembly 106, a circulation piping assembly 108, a dispensing pump assembly 110, a heating and cooling pack 7 heating system for kettle 112, a heating system for dispensing pump 114, a heating and cooling pack 7 refrigeration-chiller system 116, a machine frame 118, insulation panels 120, and a machine process control 122 that may include an operator interface panel 124.

A machine frame assembly as illustrated in FIG. 19 may include the machine frame 118, casters 126, leveling feet 128, the insulation panels 120, and a dispensing tray 129.

The chilling-refrigeration system 116 is designed to take the soup temperature in the kettle 104 through the chilling and cooling steps as described above and, for example, as mandated by the FDA. When the soup cooking is finished, in hot soup recipes the temperature is typically near boiling (about 212° F. at standard temperature and pressure, i.e., sea level). The SPDM apparatus 100 may chill the soup according the following FDA code: 200 to 135° F. unlimited time; 135 to 70° F. equal or less than 2 hours; 70 to 41.9° F. equal or less than 4 hours; 41.9 to 34° F. in 2 hours. The chilling phase begins at the 135 to 70° F. and may be accomplished by any combination of freezing temperatures, blowing fans 130, 131, recirculation resulting in an open cascade flow back to the top of the kettle, and agitator action. Exposing the cascade flow to the chilling atmosphere accelerates heat transfer, and thus, may result in faster cooling. The phase from 70 to 34° F. may be accomplished by any combination of low refrigeration temperatures, blowing fans, recirculation, and agitator action. Once the soup is at the desired long residence time temperature of 34-37° F., the refrigeration-chiller system 116 in combination with an agitator assembly 132 and the re-circulation pump assembly 102 keeps the soup ready to flow the serving volume to the dispensing pump assembly 110 where the serving volume may be heated to the recipe's serving temperature while the soup remaining in the kettle 112 may be preserved in the temperature range of about 34-37° F.

Figure 20:
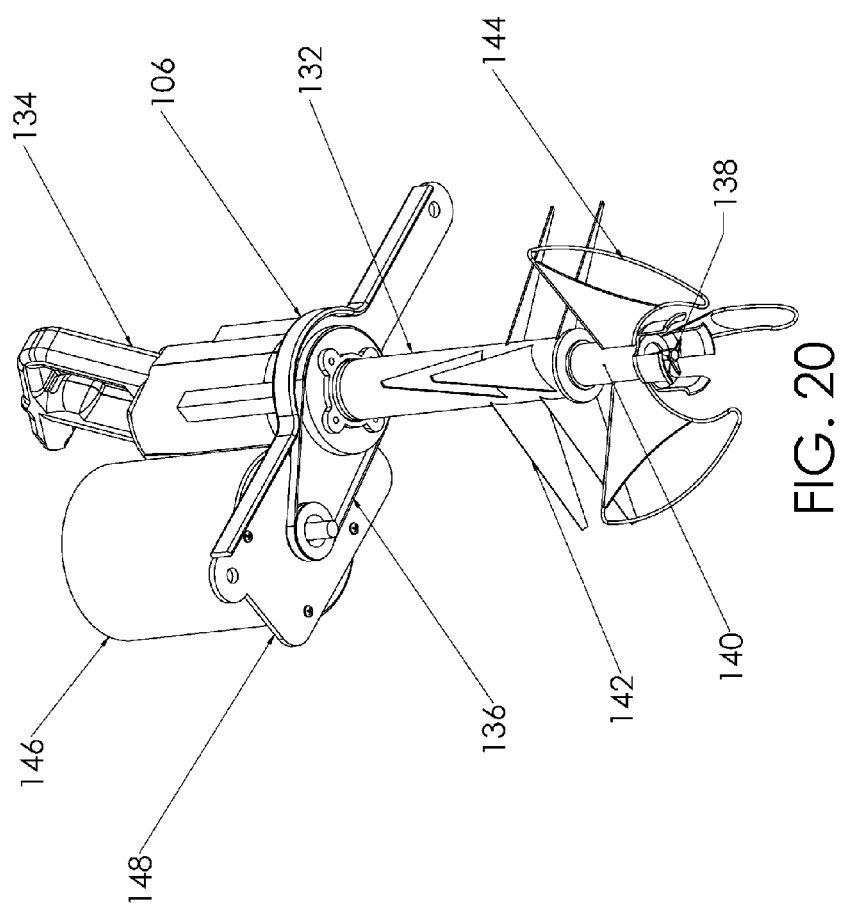

FIG. 20 is a perspective view of an exemplary embodiment of a co-axial blender-agitator assembly 106 shown in the SPDM apparatus 100 of FIG. 19. One of the functions of the SPDM apparatus 100 is for a chef to be able to cook soups from scratch. The co-axial agitator-blender assembly 106 allows the chef to blend, cook and agitate food ingredients and liquids such as milk, water, etc. for soup recipes. The individually controlled co-axial blender-agitator is assembly 106 provides the chef with both tools; a blender 134 and an agitator 136. The blender 134 may have blades 138 located in the bottom of the kettle 104, or along the coaxial shaft 140 where they may be needed.

The agitator 132 may use a combination of blades, such as a propeller 142 and a paddle and wire 144, or the like, to perform multiple agitating functions. The agitator motor drive 146 may be configured to go from 0-1800 RPM at the same torque, clock-wise and counter clock-wise. The combination of the propeller blades 142 and direction of rotation allows vertical flow in the kettle 104 in either direction. The blender 134 may be configured to rotate from 0-15,000 RPM at essentially the same torque and same direction of rotation as the agitator 136.

In another exemplary embodiment of the SPDM apparatus, the blender 134 and the agitator assembly 132 of the co-axial blender-agitator assembly 106 may share a single motor-clutch drive instead of the individual motor drives of the agitator motor drive 146 and a blender motor drive 148 used in this, the sixth, exemplary embodiment as illustrated in FIG. 20.

Figure 21:
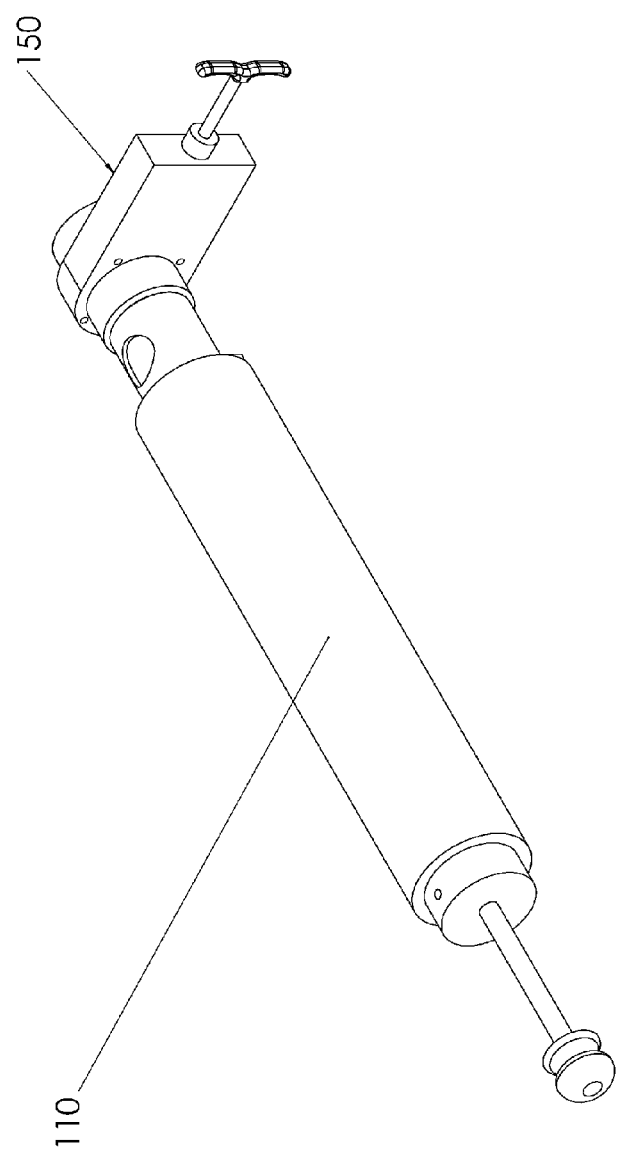
Figure 22:
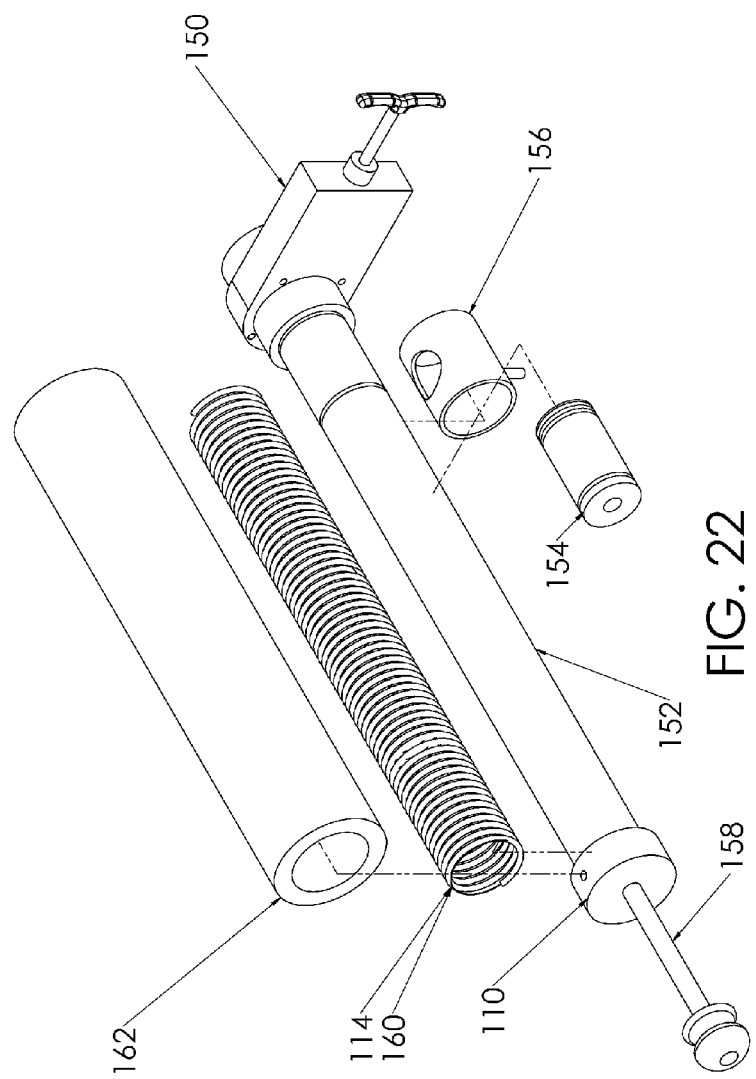

FIGS. 21 and 22 show exemplary embodiments of the component parts of the dispensing pump assembly 110 of the SPDM apparatus 100 of FIG. 19. The dispensing intake valve 150 where the soup enters the pump is similar to the soup container engine dispensing valve 17 described above. In this embodiment, the dispensing pump assembly 110 includes a cylinder 152 that contains a piston 154, a dispensing valve 156, a piston position device 158, a heating element 160 and heating element insulation 162. Not shown are the temperature sensors for the heating element and the soup temperature that may be included in this exemplary embodiment.

Referring to FIGS. 19-22, when the SPDM apparatus 100 is operated to serve a soup portion by a user, the soup is pumped by the circulation pump assembly 102. From an is intake valve 164, the soup flows through discharge valve 166 and through the dispensing intake valve 150. A re-circulation valve such as soup container engine re-circulation valve 26 (FIG. 1) that allows the soup to flow back to the kettle 104 is closed. The circulation pump assembly 102 may further include reciprocating device 168, cylinder and cylinder head 170, piston and piston pin 172, and connecting rod 174 as illustrated in FIG. 19.

The piston 154 of the dispensing pump assembly 110 may be at a starting position pushed against the dispensing intake valve 150 by the piston position device 158. When the flow pressure of soup against the dispensing intake valve 150 is greater than about 3 pounds per square inch (psi), the dispensing intake valve 150 opens and allows the soup to exert pressure against the piston 154 and the piston position device 158 allows the piston 154 to move outward (a backwards direction relative to a surface of the piston facing the soup) under flow pressure to a position that represents the desired dispensing volume. The desired volume of soup to be dispensed is then in the cylinder 152. At that position along the cylinder 152, the piston 154 is stopped by the piston position device 158, the dispensing intake valve 150 closes and the desired exact volume of soup is contained, without air entrapment, to allow the heating system for dispensing pump 114 to increase the temperature of the soup within the cylinder 152 from about 34-37° F. to the desired serving temperature according to the soup recipe as described above.

The user may operate the SPDM apparatus 100 by input to the machine process control 122 through the operator interface panel 124 including temperature controllers 178 for controlling the heating element temperature and the fluid temperature.

When the desired soup temperature is reached, dispensing valve 156 opens and the piston position device 158 pushes the piston 154 forward against the dispensing intake valve 150, which does not open. Instead, the cylinder 152 is emptied of hot soup through the dispensing valve 156. When the piston 154 returns to the starting position pushed against the dispensing intake valve 150 by the piston position device 158, the dispensing valve 156 closes and the SPDM apparatus 100 is ready for the next dispensing cycle. The cylinder 152 temperature may not allow bacteria to form. Further, the cylinder 152 may be rinsed by water supplied through another intake valve (not shown) as described above.

Figure 23:
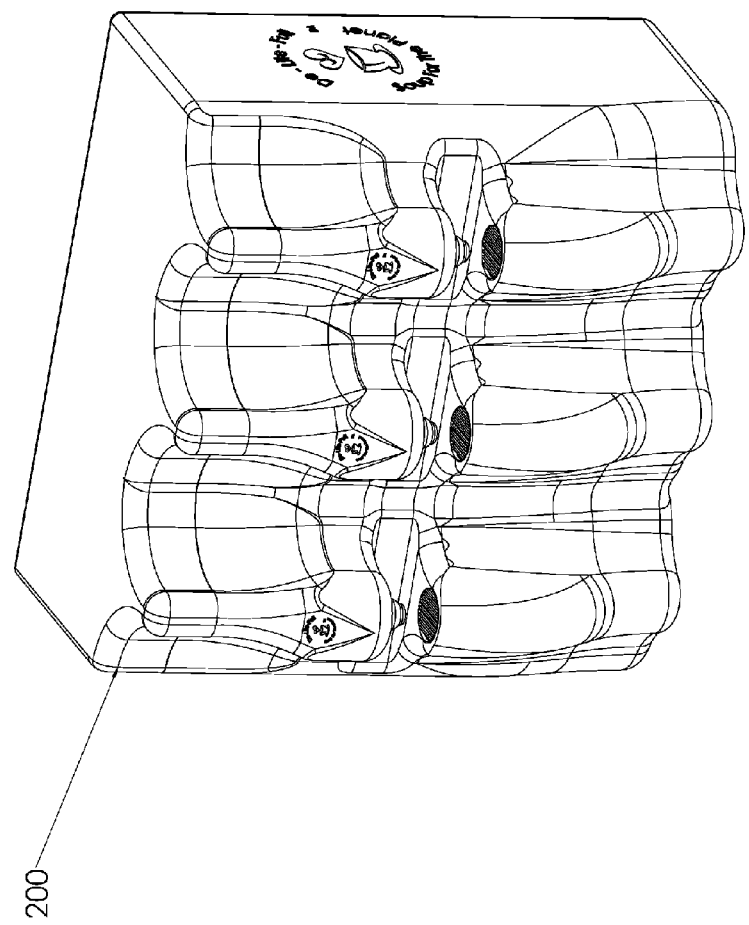

FIG. 23 is an exemplary embodiment of a multi-module SPDM apparatus 200 according to a seventh exemplary embodiment.

Figure 24:
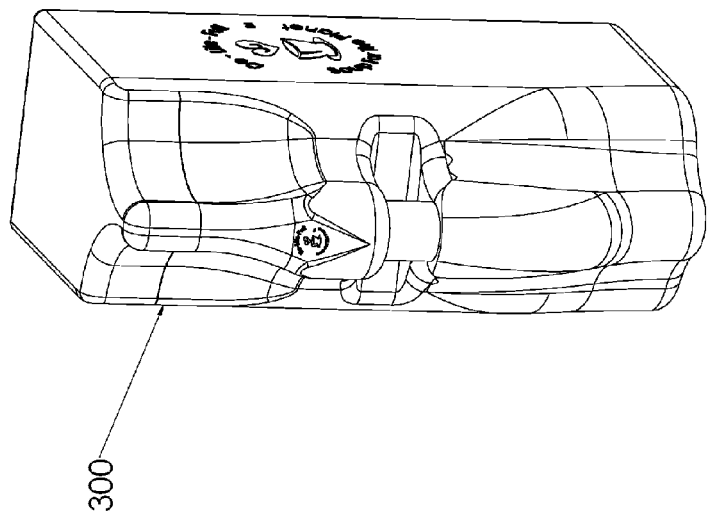

FIG. 24 is an exemplary embodiment of a single module SPDM apparatus 300 according to an eighth exemplary embodiment.

Figure 25:
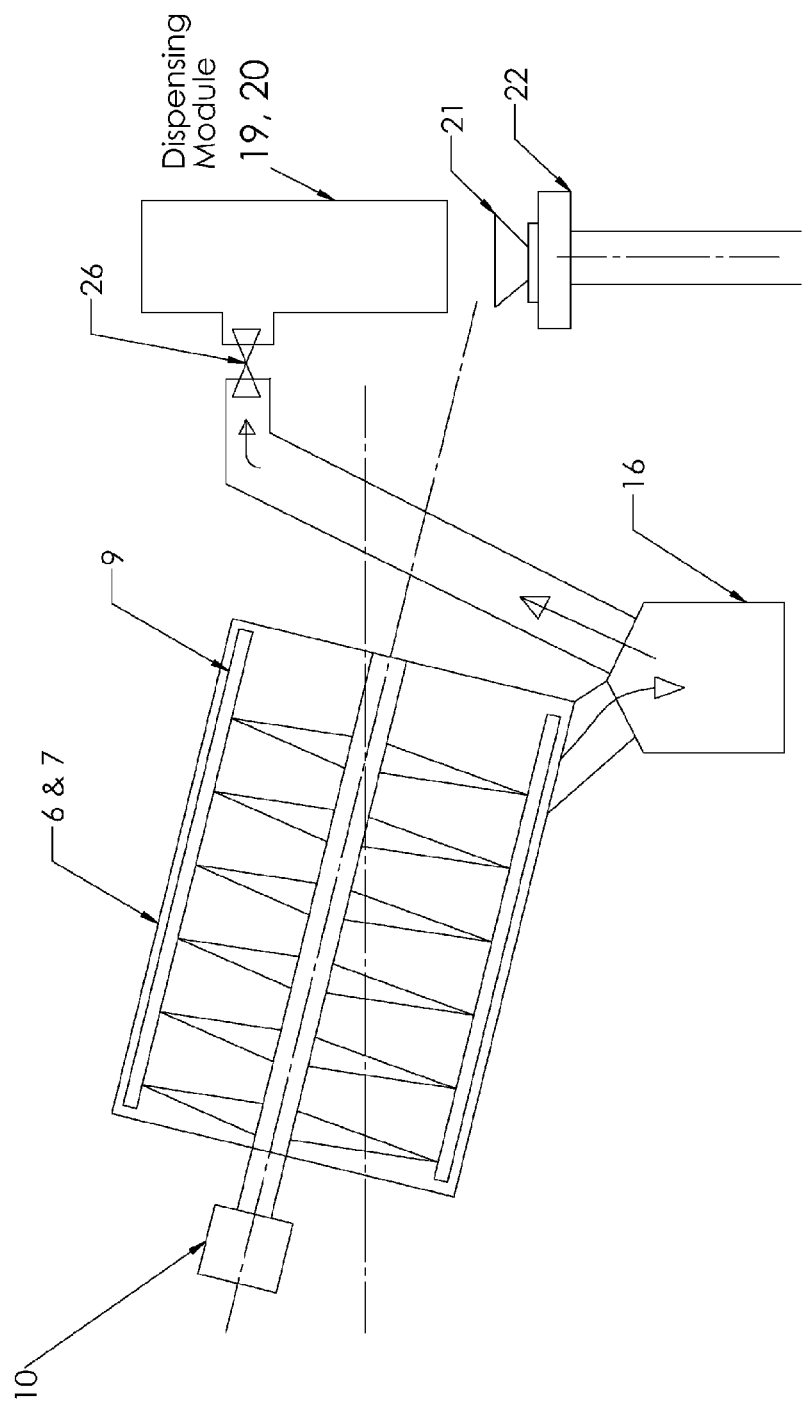
FIG. 25 shows a ninth exemplary embodiment of a soup preparing and dispensing machine (SPDM) apparatus and components thereof.

FIG. 25 shows a ninth exemplary embodiment of soup preparing and dispensing machine (SPDM) apparatus and components thereof. The SPDM of the ninth embodiment is similar to the SPDM of the first embodiment except that the soup container 8, may be oriented along a tilted axis. In this embodiment the heating and cooling pack 7 may be configured to surround the soup container having a tilted axis. The soup container agitator and wiper motor 10 may also be tilted to drive the soup container agitator and wiper 9 about the tilted axis of the soup container in this exemplary embodiment. The soup preparing and dispensing module 6 of this exemplary embodiment may also be oriented about the tilted axis. The tilted axis provides additional mixing modes and access to the soup container 8. The soup container 8 axis may be tiltable from a vertical upright position to a horizontal position or further to a vertical inverted position.

The soup container 8 may rotate about the tilted axis in a direction opposite to the soup container agitator and wiper 9. The soup container may have an opening at the soup container intake valve 13 that is off center. For example, the opening may be where the side wall meets the bottom of the soup container 8 as illustrated in FIG. 25. Further details and operation of the ninth exemplary embodiment of the SPDM are similar to those described above for the other exemplary embodiments and will not be repeated here.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A soup preparing and dispensing machine (SPDM) module to batch prepare soup, cold store the soup and dispense the soup in a serving size, the module comprising:
   a soup container configured to prepare and hold a batch of soup, the container comprising a top opening defined by upper edges of vertical sidewalls, and a bottom extending from the vertical sidewalls to a bottom opening;
   a thermal pack surrounding the soup container sidewalls and bottom, and configured to cool the prepared batch of soup in the soup container and to refrigerate the prepared batch of soup in the soup container;
   a soup container agitator and wiper disposed in the soup container configured to stir the contents of the soup container during the preparation, cooling and refrigeration of the soup, wherein the wiper is configured to wipe an inner surface of the vertical sidewalls and the bottom of the soup container;
   a soup container engine configured to pump a first portion of the prepared soup from the soup container;
   a soup container engine discharge pipe configured to receive the first portion, the soup container engine discharge pipe disposed within a portion of the thermal pack; and
   a heating chamber engine comprising an inlet, the heating chamber engine configured to heat a second portion of soup, which is pushed through the inlet by the first portion pumped into the soup container engine discharge pipe, to a serving temperature.

2. The soup preparing and dispensing machine (SPDM) module of claim 1, wherein
   the thermal pack is configured to heat the soup container to hot prepare the batch of soup in the container and cool the hot prepared batch of soup in the soup container to a refrigeration temperature in the soup container; and
   the soup container agitator and wiper comprises blender cutting blades.

3. The soup preparing and dispensing machine (SPDM) module of claim 1, wherein the heating chamber engine further comprises an outlet opposite the inlet configured to dispense the heated second portion, and a hollow cylinder arranged between the inlet and the outlet.

4. The soup preparing and dispensing machine (SPDM) module of claim 1, wherein
   the soup container engine comprises a soup container engine piston to draw the first portion out of the soup container through the bottom opening and discharge the first portion to the soup container engine discharge pipe.

5. The soup preparing and dispensing machine (SPDM) module of claim 3, wherein
   wherein the heating chamber engine comprises a rifling on an interior surface to create turbulence in the second portion of soup from the soup container to increase heat transfer to the second portion and the cylinder comprises a downward pitch to drain by gravity, and
   wherein the second portion of soup is one of a single serving cup or single serving bowl.

6. The soup preparing and dispensing machine (SPDM) module of claim 1, wherein the soup container further comprises a lid to thereby form a pressure cooker.

7. The soup preparing and dispensing machine (SPDM) module of claim 1, further comprising:
   a soup container agitator and wiper motor to rotate the soup container agitator and wiper;

a soup container engine intake valve disposed at the soup container bottom opening;

a soup container engine discharge valve disposed at an outlet of the soup container engine;

a soup container engine recirculation valve disposed at an inlet of the soup container;

a soup container engine dispensing valve disposed at the inlet of the heating chamber engine; and a heating chamber engine valve disposed at the outlet of the heating chamber engine, wherein the soup container engine discharge valve and the soup container engine dispensing valve are closed and the soup container engine intake valve is open to draw the first portion from the soup container, the soup container engine discharge valve and the soup container engine dispensing valve are open and the soup container engine intake valve and the heating chamber engine valve are closed to dispense the second portion from the soup container engine discharge pipe into the heating chamber engine; and the soup container engine discharge valve and the soup container engine recirculation valve are open and the soup container engine intake valve and the soup container engine dispensing valve are closed to dispense the second portion from the soup container engine discharge pipe into the soup container.

8. The soup preparing and dispensing machine (SPDM) module of claim 7, wherein the soup container engine dispensing valve is closed and the heating chamber engine valve is opened to dispense the heated second portion of soup.

9. A soup preparing and dispensing machine (SPDM) apparatus to batch prepare soup, cold store the soup and dispense the soup in a serving size, the apparatus comprising:

a cabinet;

at least one soup preparing and dispensing machine (SPDM) module disposed in the cabinet, comprising:

a soup container configured to prepare and hold a batch of soup, the container comprising a top opening defined by upper edges of vertical sidewalls, and a bottom extending from the vertical sidewalls to a bottom opening, a thermal pack surrounding the soup container sidewalls and bottom, and configured to heat the soup container to hot prepare the batch of soup in the container, to cool the hot prepared batch of soup in the soup container and to refrigerate the prepared batch of soup in the soup container, a soup container agitator and wiper disposed in the soup container configured to stir the contents of the soup container during a preparation, cooling and refrigeration of the soup, a soup container engine configured to pump a first portion of the prepared soup from the bottom opening of the soup container, a soup container engine discharge pipe configured to receive the first portion pumped from the bottom opening of the soup container, the soup container engine discharge pipe disposed within a portion of the thermal pack, and a heating chamber engine comprising an inlet, the heating chamber configured to heat a second portion of soup pushed through the inlet by the first portion pumped into the soup container engine discharge pipe to a serving temperature, the heating chamber engine further comprising an outlet to dispense the heated second portion, and a hollow cylinder arranged between the inlet and the outlet, a refrigeration pack disposed in the cabinet to provide cooling to the thermal pack;

a water supply tube to provide water to the SPDM module;

a power supply to provide power to the SPDM module;

a controller to control at least one of the thermal pack, the soup container agitator and wiper, the soup container engine, the heating chamber engine, the refrigeration pack, the water supply tube, and the power supply;

a container tray to support at least one serving container disposed beneath the heating chamber engine outlet;

a drain disposed beneath the container tray;

a sensor to detect whether the serving container is disposed beneath the heating chamber engine outlet and to send a signal to the controller in response to the detection;

a temperature sensor disposed in the soup container to sense a temperature and send a signal to the controller of the temperature sensed;

a heating chamber shield disposed proximate to the heating chamber engine to protect users and components from the heating chamber engine heat; and a soup prep and dispensing module access door to closably cover an opening in the housing, the opening allowing access to the SPDM module.

10. The soup preparing and dispensing machine (SPDM) apparatus of claim 9, wherein the SPDM module further comprises:

a soup container agitator and wiper motor to rotate the soup container agitator and wiper;

a soup container engine intake valve disposed at the soup container bottom opening;

a soup container engine discharge valve disposed at an outlet of the soup container engine;

a soup container engine recirculation valve disposed at an inlet to the soup container;

a soup container engine dispensing valve disposed at the inlet of the heating chamber engine; and a heating chamber engine valve disposed at the outlet of the heating chamber engine, wherein the soup container engine discharge valve and the soup container engine dispensing valve are closed and the soup container engine intake valve is open to draw the first portion from the soup container, the soup container engine discharge valve and the soup container engine dispensing valve are open and the soup container engine intake valve and the heating chamber engine valve are closed to dispense the second portion from the soup container engine discharge pipe into the heating chamber engine, the soup container engine discharge valve and the soup container engine recirculation valve are open and the soup container engine intake valve and the soup container engine dispensing valve are closed to dispense the second portion from the soup container engine discharge pipe into the soup container, and the soup container engine dispensing valve is closed and the heating chamber engine valve is opened to dispense the heated second portion of soup.

11. The soup preparing and dispensing machine (SPDM) module of claim 1, wherein the heating chamber engine comprises a dispensing pump assembly, the dispensing pump assembly comprising:

a cylinder and a piston contained in the cylinder; and a dispensing intake valve, wherein movement of the piston in the cylinder draws a desired volume of soup into the cylinder based on a flow pressure of soup against the dispensing intake valve.

* * * * *